United States Patent [19]
Tabuchi

[11] Patent Number: 5,611,006
[45] Date of Patent: Mar. 11, 1997

[54] HYBRID TYPE INTEGRATED OPTICAL DEVICE HAVING DOUBLE-LAYERED SUBSTRATE

[75] Inventor: Haruhiko Tabuchi, Kawasaki, Japan

[73] Assignee: Fujitsu Limited, Kawasaki, Japan

[21] Appl. No.: 275,309

[22] Filed: Jul. 15, 1994

[30] Foreign Application Priority Data

Aug. 31, 1993 [JP] Japan .................................. 5-216633

[51] Int. Cl.⁶ .............................. H01L 27/13; G02B 6/10
[52] U.S. Cl. .................................. 385/14; 385/35; 385/88; 257/432
[58] Field of Search .................................. 385/14, 35, 49, 385/50, 52, 88, 89, 90, 91, 92; 257/432

[56] References Cited

U.S. PATENT DOCUMENTS

| | | | |
|---|---|---|---|
| 4,875,750 | 10/1989 | Spaeth et al. | 385/35 |
| 5,016,965 | 5/1991 | Marshall et al. | 385/35 |
| 5,064,266 | 11/1991 | San et al. | 385/35 |
| 5,321,786 | 6/1994 | Valette et al. | 385/92 |

FOREIGN PATENT DOCUMENTS

| | | | |
|---|---|---|---|
| 0171615 | 2/1986 | European Pat. Off. | 385/95 |
| 0465230 | 1/1992 | European Pat. Off. | 385/14 |
| 3809396 | 10/1989 | Germany | 385/35 |
| 91/02392 | 2/1991 | WIPO | 385/14 |

OTHER PUBLICATIONS

*Patent Abstracts of Japan*, vol. 7, No. 18 (P–170), Jan. 25, 1983 & JP–A–57 172308 (Tateishi Denki KK), Oct. 23, 1982.

Primary Examiner—Donald L. Monin, Jr.
Attorney, Agent, or Firm—Staas & Halsey

[57] ABSTRACT

An integrated optical device including: a composite substrate (1, 6) having a support substrate (1) and a laminated upper layer (6) formed on the support substrate, the upper layer having a preselected height and being capable of being selectively etched; a recess formed in the upper layer; a positioning hole (7, 8) formed in a surface portion of the support substrate exposed in the recess; a first optical component disposed on the surface of the upper layer; a second optical component guided by a portion of the recess and mounted on the surface of the support substrate; and a third optical component disposed in the positioning hole. Components having different height can be easily aligned on an optical axis.

19 Claims, 19 Drawing Sheets

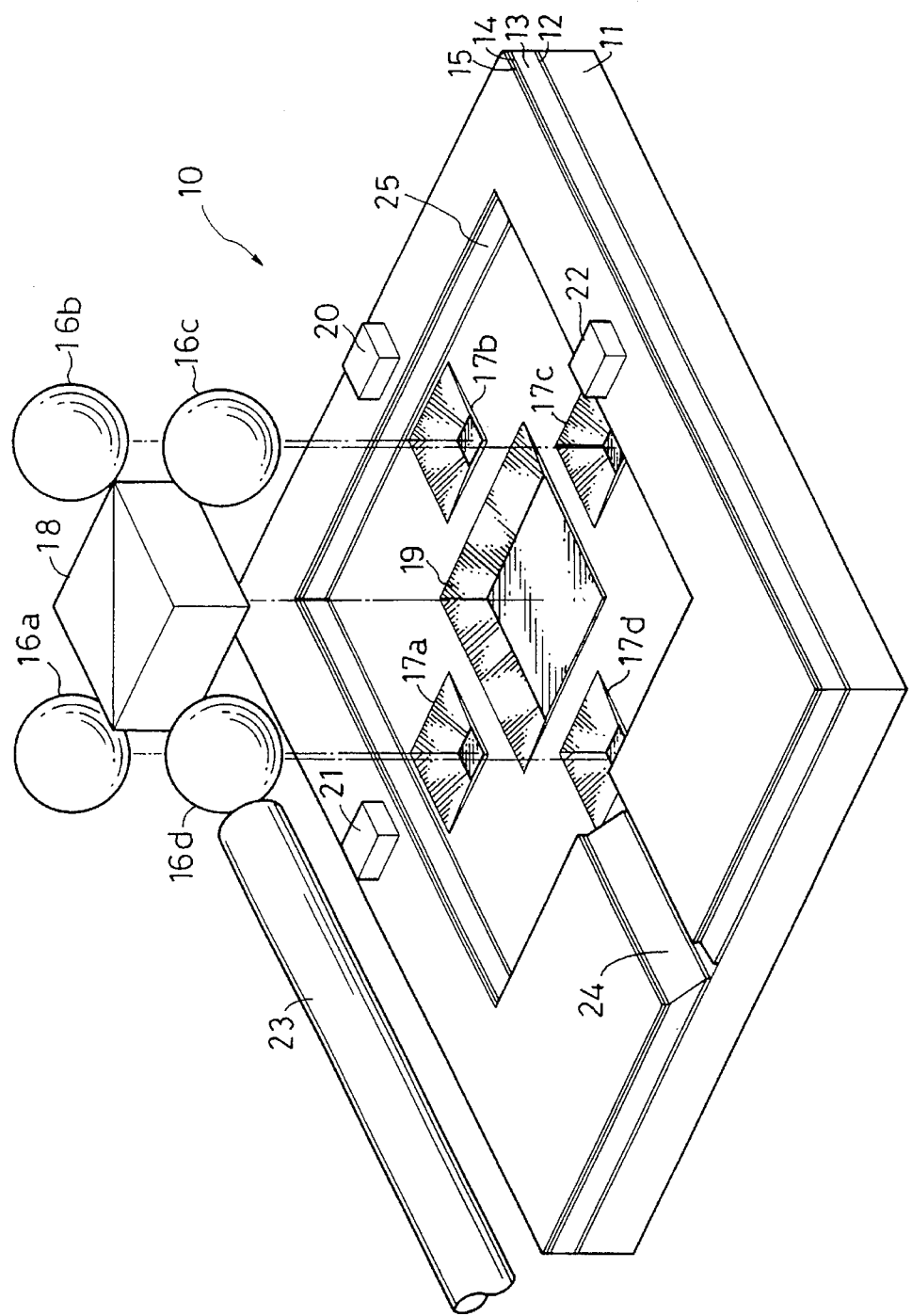

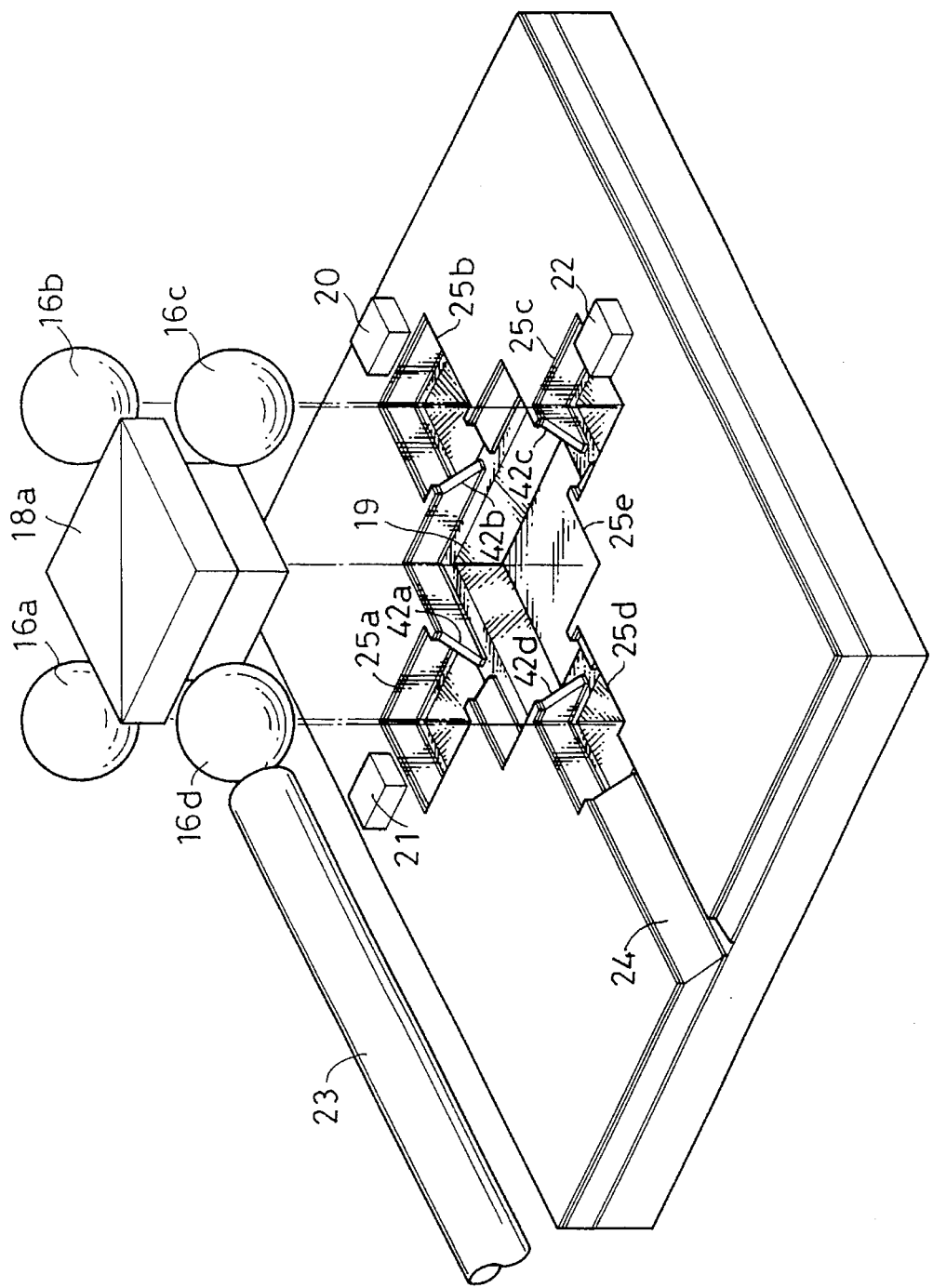

HYBRID TYPE INTEGRATED OPTICAL DEVICE HAVING DOUBLE-LAYERED SUBSTRATE

BACKGROUND OF THE INVENTION a) Field of the Invention

The present invention relates to an integrated optical device, and more particularly to a hybrid type integrated optical device having optical components such as laser diodes, photo-isolators, and photodiodes, respectively integrated on a single substrate.

b) Description of the Related Art

FIG. 16 shows a conventional transceiver for optical communications. A laser diode chip 103 is fixed to a sub-carrier 101, with a heat sink 102 being interposed therebetween. Lenses 105 and 108 are fixed to lens holders 104 and 107. An optical fiber 110 is fixed by an optical fiber holder 111.

A laser beam emitted from a laser diode chip 103 is collimated by the lens 105, passes through an optical member 106 such as a optical-isolator, is converged by the lens 108, and guided to the optical fiber 110.

For the alignment of an optical axis, the sub-carrier 101, lens holders 104 and 107, optical member 106, and optical fiber holder 111 are all placed on a fine positional adjuster to precisely align the optical axes with one another.

This alignment is performed by measuring the intensity of a laser beam emitted from the laser diode chip 103, entered the optical fiber 110, and outputted therefrom. After the optical axis alignment, the holders and carriers are fixed to a substrate 100, for example, by laser welding.

With this method, it is necessary to use an assembly apparatus equipped with a fine adjuster which performs a precise position alignment. It takes a time to finish optical axis alignment. As a result, manufactured optical devices become expensive.

It is difficult to make optical components compact because these components are required to be mounted on the assembly apparatus. It is also necessary to change the structure of the assembly apparatus each time the structure of an optical device is changed. This method therefore is not suitable for manufacturing a small number of, and a variety of, optical devices.

FIG. 17 shows the structure of an integrated optical device eliminating the above disadvantages, as proposed in the Proceedings of the 1992 IEICE Autumn Conference, page4–235.

Lenses 121 and 124 are fitted in lens guide holes 127 and 128 formed on a single crystal silicon substrate 120 to fix the lens positions. As the lens guide holes, via holes may be used which are of an upside-down pyramid shape surrounded by the (1 1 1) planes exposed by anisotropically etching a silicon substrate having the (1 0 0) plane.

In order to eliminate eclipse of a laser beam to be caused at the surface of the substrate 120, laser beam transmitting groves 129, 130, 131, . . . are formed on the surface of the substrate 120 along the optical axes by light assisted etching.

The light assisted etching, which includes the etching technology called laser assisted etching, laser-induced chemical etching, UV light-excited silicon dry etching, and laser ablation, is a method of selectively etching the surface of a substrate only where a high output laser beam such as a YAG laser, argon laser, and excimer laser is applied. With this method, the laser beam transmitting grooves can be formed on the substrate surface by scanning a laser beam along the optical axes.

A filter type prism 126 is fitted in a hole formed on the surface of the silicon substrate 120 so that the prism 126 can be easily aligned in position.

An incident light beam which enters through the groove 131 includes the light beams having wavelength of 1.31 μm and 1.55 82 m. The combined prism 126 splits the incident light beams into 1.31 μm light beam and 1.55 μm light beam. The light beam of 1.55 μm is bented by a plane interference filter formed in the combined prism 126 and launched from the substrate through the groove 132. A portion of the light beam of 1.31 μm is reflected by another plane and travels through the groove 130 and reaches to the photodiode 125. A portion of a light beam emitted from a laser 122 goes through the prism 126 and is launched from the substrate through the groove 131.

Since lenses and the like are aligned in position by forming lens guide holes and the like by anisotropic etching of silicon, complicated optical axis alignment is not necessary.

In the conventional optical device shown in FIG. 17, the substrate surface is etched by light assisted etching to form laser beam transmitting grooves. Therefore, it becomes necessary to scan the substrate surface to be etched by a laser beam or the like.

It is difficult, however, to scan a laser beam at a high speed. It is also necessary to scan a plurality of times in order to obtain a desired etching depth, for example, to obtain a groove of about 50 μm depth shown in FIG. 17. As a result, it takes a long time to work substrates.

SUMMARY OF THE INVENTION

It is an object of the present invention to provide an integrated optical device capable of being assembled without any adjustment and easily working a substrate on which optical components are mounted.

It is another object of the present invention to provide a method of manufacturing an integrated optical device capable of being assembled without any adjustment and easily working a substrate on which optical components are mounted.

According to one aspect of the present invention, there is provided an integrated optical device comprising: a support substrate (1) having a first upper surface; an optical system (3,4) disposed on said first upper surface and having a plurality of optical input/output ports and a plurality of optical axes which connect the optical input/output ports, the optical axes through said optical system are parallel to said first upper surface, said optical system being designed so as to have a first height from said first upper surface to the optical axes thereof, said first height being larger than a maximum beam radius of a light beam which travel along the optical axes through said optical system; an upper layer (6) formed on said first upper surface and formed of a material which is selectively removable with respect to said substrate, and having a second upper surface at a second height larger than said beam radius and smaller than said first height and an opening (25) accommodating said optical system therewithin; a first optical component (2) mounted on said second upper surface close to said opening, and having an optical input/output port, and an optical axis at a same level as optical axis level through said optical system, and said first optical component being mounted on an imaginary line along an optical axis extending from one of the optical input/output ports of said optical, system so as to optically connect said first optical component to said optical system; and a second optical component mounted on said second upper surface close to said opening, and having an optical input/output port, and an optical axis at a same level as optical axis level through said optical system, and said second optical component being mounted on an imaginary line along an optical axis extending from another of the optical input/output ports of said optical system so as to optically connect said second optical component to said optical system.

According to another aspect of the invention, there is provided an integrated optical device including: a substrate having a support substrate and a laminated upper layer formed on the support substrate, the upper layer having a predetermined height and being capable of being selectively etched; an opening formed in the upper layer; a positioning hole formed on the surface of the support substrate exposed in the opening; a first optical component disposed on the surface of the upper layer, and having a first height from a bottom to an optical axis of the first optical component, a optical system formed at inside of the opening on the surface of the support substrate, and having a second height from a bottom to an optical axis of the second optical component, the second height being greater than the first height; and a second optical component disposed in the positioning hole, and having a third height from a bottom to an optical axis of the second optical component, the third height being greater than the second height.

According to another aspect of the present invention, there is provided an integrated optical device including: a substrate including a silicon substrate having a main surface, a dielectric layer disposed on the main surface of the silicon substrate, and a silicon layer formed on the dielectric layer; an optical fiber guide groove formed in the silicon layer for aligning an optical fiber having an optical axis in position; an opening-formed in the silicon layer and the dielectric layer, the opening communicating with the optical fiber guide groove, and having a bottom at and exposing the silicon substrate; a second spherical lens disposed on an optical axis extending from the optical axis of the optical fiber aligned in position by the optical fiber guide groove and having a focal point at an end face of the optical fiber; a second lens guide hole formed on the main surface of the silicon substrate exposed at the bottom of the opening for aligning the second spherical lens in position; a first spherical lens disposed on the optical axis at a position remote from the optical fiber more than the second spherical lens; a first lens guide hole formed on the main surface of the silicon substrate exposed at the bottom of the opening for aligning the first spherical lens in position; and a first semiconductor optical element mounted on a surface of the substrate and on the optical axis at substantially a focal point of the first spherical lens.

The integrated optical device may further includes: a cube type half mirror, which is often called beam splitter cube, disposed on the optical axis between the first spherical lens and the second spherical lens; a cube type half mirror guide hole formed on the surface of the silicon substrate for aligning the cube type half mirror in position, at least a portion of the opening of the cube type half mirror guide hole appearing at the bottom of the opening; a third spherical lens disposed on an optical axis of a light transmitted on the main optical axis and reflected by the cube type half mirror; a third lens guide hole formed on the surface of the silicon substrate exposed at the bottom of the opening for aligning the third spherical lens in position; and a second semiconductor element mounted on the surface of the substrate and on the optical axis of the reflected light at substantially a focal point of the third spherical lens.

The integrated optical device may further includes: a fourth spherical lens disposed on an optical axis of a light transmitted on the main optical axis and reflected by the cube type half mirror in the direction opposite to the reflected light to the third spherical lens; a fourth lens guide hole formed on the surface of the silicon substrate exposed at the bottom of the opening for aligning the fourth spherical lens in position; and a third semiconductor element mounted on the surface of the substrate and on the optical axis of the reflected light to the fourth spherical lens at substantially a focal point of the fourth spherical lens.

The integrated optical device may further includes: a optical-isolator disposed on the main optical axis; and a optical-isolator guide groove formed on the surface of the substrate for aligning the optical-isolator in position.

In this case, it is preferable that the normal directions of the light exit and light incident planes of the optical-isolator is in parallel with the surface of the silicon substrate, and inclined by a predetermined angle relative to the main optical axis.

According to another aspect of the present invention, there is provided a method of manufacturing an integrated optical device including the steps of: selectively etching the surface of a silicon substrate to form a guide hole for the position alignment of an optical component; attaching another silicon substrate with a dielectric film formed on the surface thereof to the silicon substrate by facing the plane of the other silicon substrate on the side of the dielectric film with the plane of the silicon substrate on the side of the guide hole; thinning the other silicon substrate to a preselected thickness starting from the plane not formed with the dielectric film; forming an opening in the other silicon substrate where an optical component is aligned in position by the guide hole, and exposing the guide hole; forming a light beam transmitting groove in the other silicon substrate where a light beam transmits; and forming an optical fiber guide groove in the other silicon substrate for aligning an optical fiber in position.

The opening forming step, the light beam transmitting groove forming step, and the optical fiber guide groove forming step may be executed at the same time by etching the other silicon substrate and the dielectric film.

Optical components are disposed at different heights on a substrate of a two-layered structure so that optical axes of the components can be easily aligned with one another. A semiconductor optical element is mounted on the upper layer, and an optical fiber is aligned in position by a groove formed in the upper layer. Spherical lenses, a half mirror, and the like are aligned in position by holes formed in the lower layer. Portions of the upper layer where a light beam transmits is etched. In this manner, eclipse of a light beam at the surface of a silicon substrate can be avoided.

Light beam transmitting grooves can be formed at the same time by etching so that the manufacturing time is not elongated.

The side walls of an opening in the upper layer in which a spherical lens is mounted may be made vertical relative to the substrate surface so that the distance between the spherical lens and other optical elements fixed to the upper layer can be shortened. Accordingly, it is possible to use a spherical lens having a large numerical aperture and improve a light coupling efficiency.

An opening having the side walls vertical to the substrate surface may be formed in the upper layer. In the assembly of an optical component such as a cube type half mirror having the vertical side walls, the vertical side walls off the mirror can be pushed against the side walls of the opening so that position alignment can be performed at a high precision.

An optical component such as a optical-isolator may be disposed at the position where a light beam collimated by a spherical lens transmits. In this case, the operation of, for example, a laser diode, can be made more stable.

If a optical-isolator is inclined relative to the optical axis, reflected light from the optical-isolator can be reduced.

By using a two-layered substrate having a position alignment structure on the surface thereof, it is possible to manufacture an integrated optical device having a high light coupling efficiency in a short time, without optical axis alignment.

BRIEF DESCRIPTION OF THE DRAWINGS

FIG. 2 is a perspective view of an integrated optical device according to a first specific embodiment of the present invention.

FIG. 14 is a perspective view of an integrated optical device of a first modification of the sixth specific embodiment.

DETAILED DESCRIPTION OF THE PREFERRED EMBODIMENTS

A fundamental embodiment of the present invention will be described with reference to FIGS. 1A and 1B.

Figure 1A:
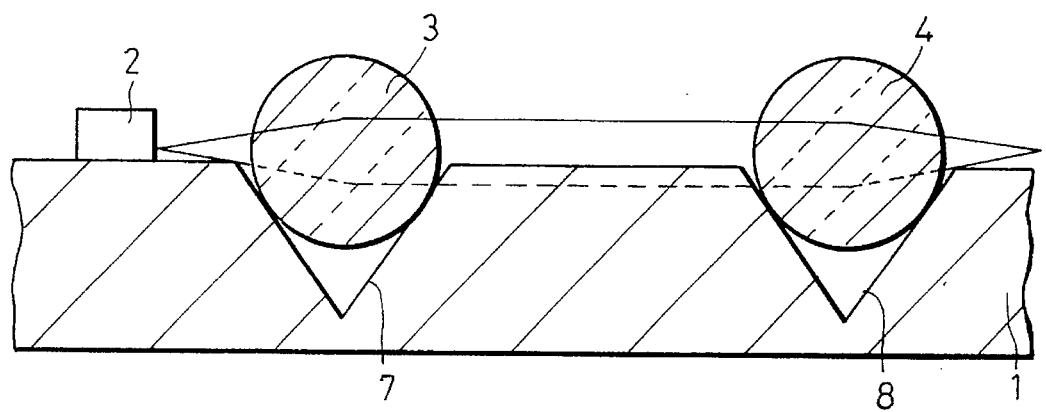
FIGS. 1A and 1B are cross sectional views of an integrated optical device according to a fundamental embodiment of the present invention and of a conventional integrated optical device.

FIG. 1A shows the outline of the optical axis of a conventional optical device.

A laser diode chip 2 is mounted on a silicon substrate 1. An emitted laser beam is collimated by a spherical lens 3. The collimated laser beam is transmitted to and converged by another spherical lens 4 and guided to an unrepresented optical fiber. The spherical lenses 3 and 4 are fitted in lens guide holes 7 and 8 of a letter V-shape in section formed on the surface of the silicon substrate 1 for the position alignment thereof. The silicon substrate 1 has a particular crystal plane such as the (1 0 0) plane, and the lens guide holes can be formed by exposing a particular crystal plane such as the (1 1 1) plane by anisotropic etching. If only the lenses 3 and 4 can be precisely aligned in position, the shape of the lens guide hole is not necessarily an upside-down quadrangular pyramid, but the shape may be, for example, an upside-down triangular pyramid, or an upside-down truncated pyramid.

Generally, the height of an active layer of the laser diode chip 2 from the surface of the silicon substrate 1 is about 10 μm, and the diameter of the collimated laser beam is about 100 μm. As a result, some of the laser beam is shielded by the silicon substrate 1 and cannot reach the optical fiber, thereby generating so-called eclipse.

In order to avoid eclipse, it becomes necessary to etch the surface of the silicon substrate 1 and allow the laser beam to transmit without being shielded. If this surface etching is to be performed at the same time when the spherical lens guide grooves are etched, the shape of the grooves becomes irregular and has low precision. From this reason, light assisted etching or other processes have been used conventionally.

Figure 1B:
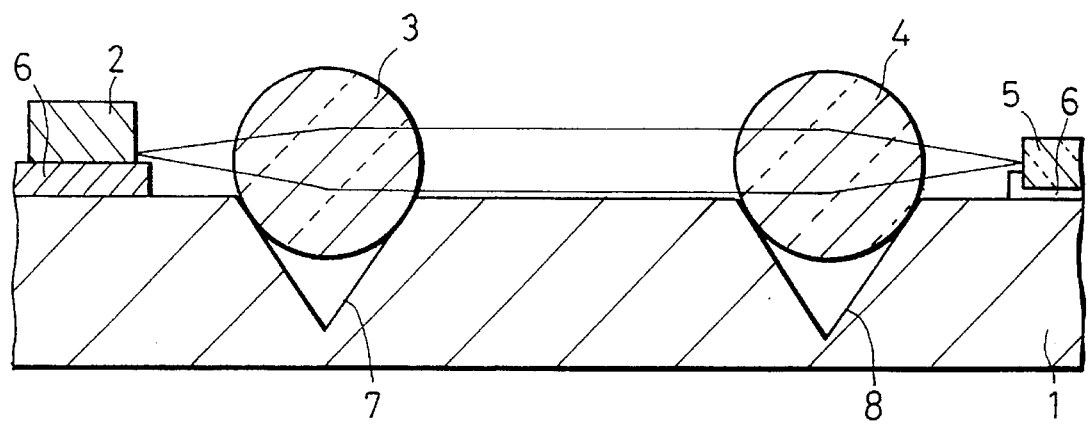

FIG. 1B shows the outline of the optical axis of an optical device of the fundamental embodiment according to this invention. The difference of this embodiment from conventional optical devices is as follows. A lower silicon substrate 1 on which lens guide grooves 7 and 8 having a V-shaped section are formed, is attached to another silicon substrate 6. A laser diode chip 2 is mounted on the upper silicon substrate 6, and an optical fiber 5 is fitted in an optical fiber guide groove formed in the upper silicon substrate 6. The upper silicon substrate 6 where the laser beam transmits is removed by etching.

If the thickness of the upper silicon substrate 6 is about 55 μm, the height of the optical axis of the laser beam is about 65 μm from the surface of the lower silicon substrate 1. Because the diameter of the laser beam is about 100 μm, the structure shown in FIG. 1B can avoid eclipse. Reference numerals 24 and 25 will be explained in connection with FIG. 2.

In this embodiment, it is possible to put an optical isolator between the two spherical lenses. A single spherical lens may be used instead of a pair of spherical lens 3 and 4, if there is no optical element between the lenses.

Figure 3A:
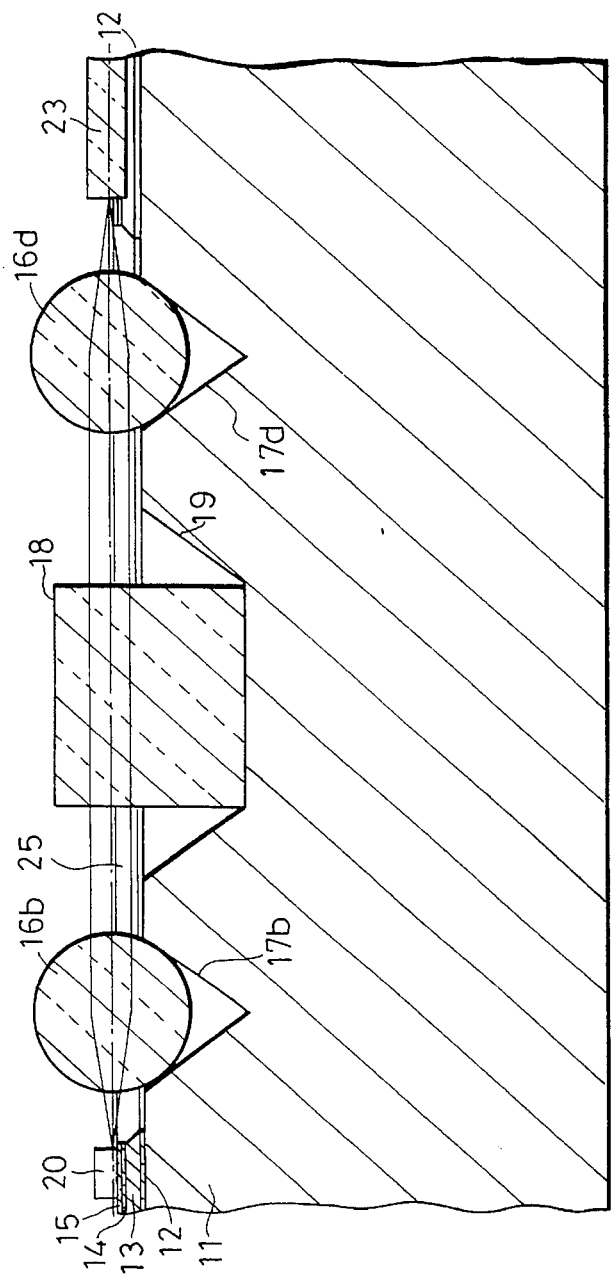
FIGS. 3A and 3B are cross sectional views of the integrated optical device of the first specific embodiment.
Figure 3B:
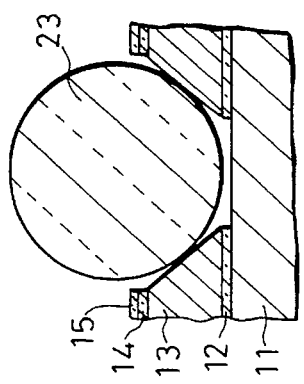

FIGS. 2, 3A, and 3B show an integrated optical device according to a first specific embodiment of the present invention. FIG. 2 is a perspective view, FIG. 3A is a cross sectional view taken along the axis of an optical fiber, and FIG. 3B is a cross sectional view taken along a plane traversing an optical fiber. Optical components are assembled on a substrate 10 having a laminated structure of a silicon substrate 11 with the (1 0 0) planes, an $SiO_2$ film 12, a silicon layer 13 with the (1 0 0) plane, an $SiO_2$ film 14, and an $Si_3N_4$ film 15, stacked in this order.

An opening 25 is formed in the $SiO_2$ film 12, (1 0 0) silicon layer 13, $SiO_2$ film 14, and $Si_3N_4$ film 15, to expose the silicon substrate 11 at the bottom off this opening 25. A laser diode chip 20 is flip-chip bonded to the surface of the $Si_3N_4$ film 15 in close vicinity to the opening 25. A laser beam emitted from the laser diode chip 20 is collimated by a spherical lens 16b.

Along the optical axis of the laser beam, a cube type half mirror 18, a spherical lens 16d, and an optical fiber 23 are disposed. The laser beam transmitted through the cube type half mirror 18 is converged by the spherical lens 16d and guided to the core of the optical fiber 23 at the end surface thereof.

The spherical lenses 16b and 16d and cube type half mirror 18 are aligned in position by lens guide V-shaped holes 17b and 17d and a cube type half mirror guide hole 19 formed on the surface of the silicon substrate exposed at the bottom of the opening 25. These guide holes are of an upside-down quadrangular pyramid or truncated quadrangular pyramid having the (1 0 0) plane before and the (1 1 1) plane side walls.

The spherical lenses 16b and 16d are aligned in position at four points on the side walls of the lens guide V-shaped holes 17b and 17d. The size and shape of the bottom of the cube type half mirror 18 are the same as the bottom of the cube type half mirror guide hole 19 of a truncated pyramid shape so that the cube type half mirror 19 can be precisely aligned in position by tightly contacting its bottom with the bottom of the guide hole 19.

The optical fiber 23 is aligned in position by an optical fiber guide V-shaped groove 24 formed in the $SiO_2$ film 12, (1 0 0) silicon layer 13, $SiO_2$ film 14, and $SiN_4$ film 15 along the optical axis.

This V-shaped groove 24 has a trapezoidal shape in section having the side walls with the (1 1 1) plane and the surface of the silicon substrate 11 as its bottom. This groove 24 can be formed by anisotropically etching the (1 0 0) silicon layer 13.

A spherical lens 16a is disposed on the optical axis of a laser beam emitted from the laser diode chip 20 and reflected at a right angle by the cube type half mirror 18.

The laser beam is converged by the spherical lens 16a and guided to the light receiving region of an edge incidence type photodiode chip 21 which is flip-chip bonded to the surface of the $Si_3N_4$ film 15.

A laser beam outputted from the optical fiber 23 in the upper right direction in FIG. 2 is collimated by the spherical lens 16d and reflected by the cube type half mirror 18 in the direction opposite to the spherical lens 16a.

Along the optical axis of this reflected laser beam, a spherical lens 16c is disposed so that the laser beam is converged by the spherical lens 16c and guided to the light receiving region of an edge incidence type photodiode chip 22 which is flip-chip bonded to the surface of the $Si_3N_4$ film 15.

The spherical lenses 16a and 16c are aligned in position by lens guide V-shaped holes 17a and 17c formed on the surface of the silicon substrate exposed at the bottom of the opening 25, similar to the spherical lenses 16b and 16d.

FIG. 3A is a cross sectional view of the integrated optical device shown in FIG. 2, taken along the vertical plane passing through the optical axis of the optical fiber 23 and laser diode chip 20.

FIG. 3B is a cross sectional view taken along the vertical plane perpendicular to the optical axis of the optical fiber 23. The height of the optical axis is 10 μm from the surface of the $Si_3N_4$ film 15. This height corresponds to the height of the center of the active region of the laser diode chip 20 and edge incidence type photodiode chips 21 and 22 which are flip-chip bonded to the surface of the $Si_3N_4$ film 15.

In the first embodiment, the diameters of the spherical lenses 16a to 16d are 0.8 mm, the diameter of a laser beam collimated by the spherical lens is about 0.1 mm, the optical path length between opposing spherical lenses is 4 mm, the length of a side of the cube type half mirror 18 is 2 mm, the thickness of the $SiO_2$ film 12 is 2 μm, the thickness of the silicon layer 13 is 55 μm, the thicknesses of the $SiO_2$ film and $Si_3N_4$ are 0.3 μm each, the length of a side of the opening of the lens guide V-shaped holes 17a and 17b is 885 μm, the length off a side off the opening off the cube type half mirror guide hole 19 is 2440 μm, the width of the opening of the optical fiber guide V-shaped groove 24 is 139 μm, the thickness of the silicon substrate 11 is 600 μm, and the size of the substrate 10 is 10 mm * 15 mm * 0.66 mm.

The core of the optical fiber 23 having the diameter of 125 μm fitted in the optical fiber guide V-shaped groove 24 having the span length of the opening of 139 μm, has a height of 10 μm from the surface of the $Si_3N_4$ film 15. Therefore, the height of the core of the optical fiber 23 can be aligned with the height of the active region of the laser diode chip 20.

The function of the integrated optical device of the first embodiment will be described.

Figure 4:
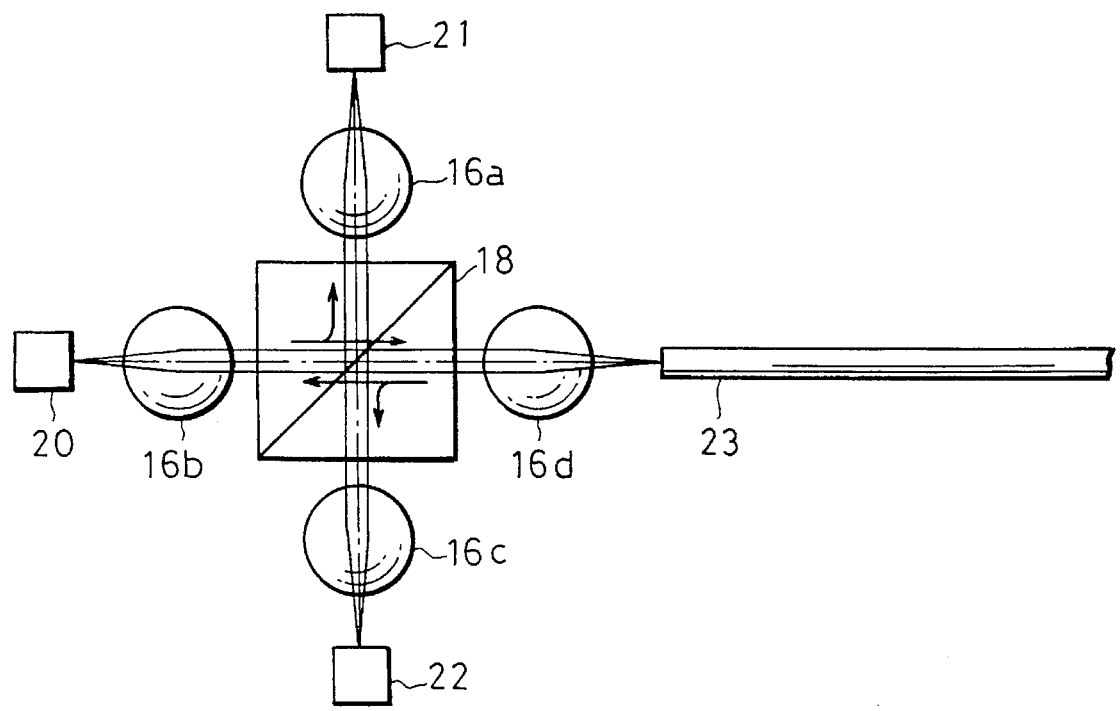
FIG. 4 is a schematic plan view explaining the function of the integrated optical device of the first specific embodiment.

FIG. 4 is a schematic diagram showing only the optical components of the integrated optical device of the first embodiment.

First, a light reception function will be described. A laser beam outputted from the optical fiber 23 is collimated by the spherical lens 16d. A portion of the laser beam is reflected by the cube type half mirror 18, focused by the spherical lens 16c, and becomes incident upon the edge incidence type photodiode chip 22. Although another portion of the laser beam outputted from the optical fiber 28 reaches the laser diode chip 20, this laser beam is not used.

Next, a light transmission function will be described. A laser beam emitted from the laser diode chip 20 is collimated by the spherical lens 16b and divided into two laser beams by the cube type half mirror 18. The laser beam transmitting straight ahead in the cube type half mirror 18 is focused by the spherical lens 16d and becomes incident upon the optical fiber 23.

The laser beam reflected at the cube type half mirror 18 is focused by the spherical lens 16a and becomes incident upon the edge incidence type photodiode chip 21. The laser beam incident upon the edge incidence type photodiode chip 21 is used for stabilizing the output of the laser diode chip 20.

An edge incident type photodiode described in the proceeding of the 1993 IEICE Spring Conference, page 4–316, may be used in this embodiment. It has large fiber alignment tolerance of 60 μm parallel to the junction and 7 μm perpendicular to the junction, and provides high coupling efficiency with relatively rough alignment.

Figure 5:
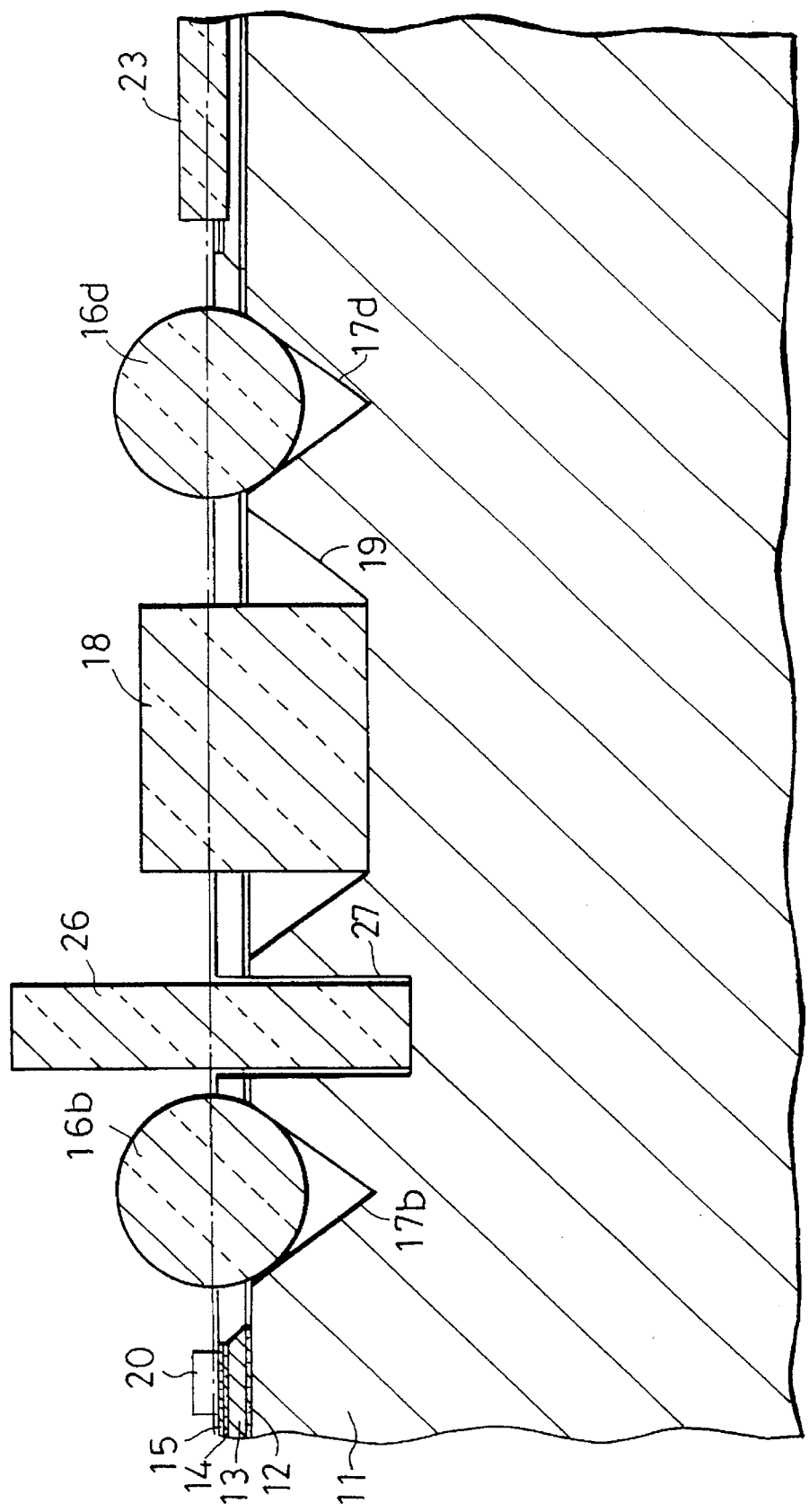
FIG. 5 is a cross sectional view of an integrated optical device of a first modification of the first specific embodiment.

FIG. 5 is a cross sectional view of an integrated optical device according to a first modification of the first embodiment. In the integrated optical device shown in FIG. 5, the distance between the spherical lens 16b and cube type half mirror 18 of the integrated optical device shown in FIG. 2 and FIGS. 3A and 3B is made longer, and a optical-isolator 26 is disposed therebetween. The optical-isolator 26 is fitted in a photo-isolator guide groove 27 formed by a dicing saw for the position alignment thereof.

A thin photo-isolator having a thickness of about 2 mm may be used as the photo-isolator 26. The structure of a thin photo-isolator and its manufacturing method are well known as disclosed, for example, in the Proceedings of the 1991 IEICE Autumn Conference, page 4–177.

With the arrangement described above, a laser beam emitted from the optical fiber 23 and back reflected beam from the cube type half mirror and the fiber end can be prevented from becoming incident upon the laser diode chip 20, and the operation of the laser diode chip 20 can be prevented from becoming unstable by the injecting laser beam.

Figure 6:
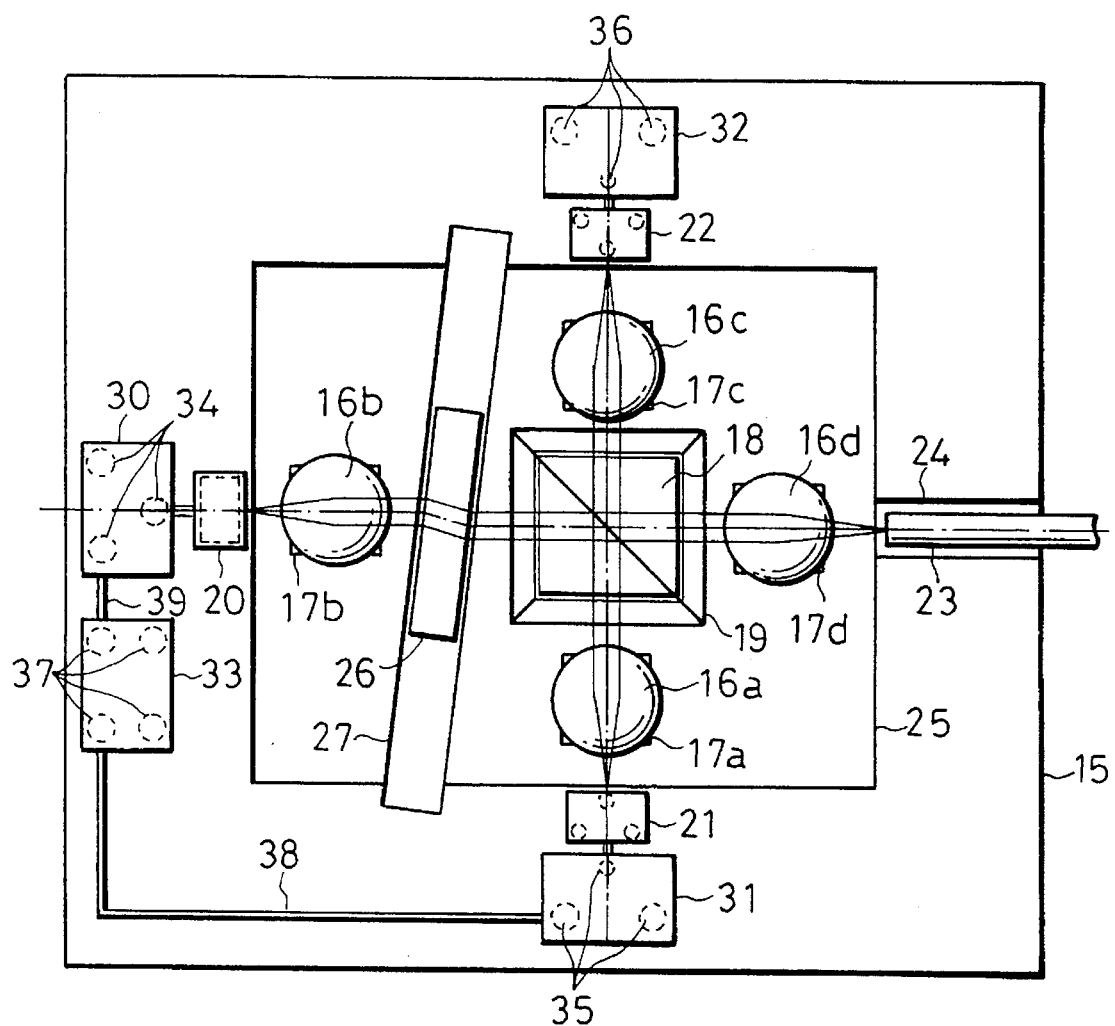
FIG. 6 is a plan view of an integrated optical device of a second modification of the first specific embodiment.

FIG. 6 shows an integrated optical device according to a second modification of the first embodiment.

Bonding pads 34, 35, 36, and 37 are formed on the $Si_3N_4$ film 15 of the integrated optical device of the first modification of the first embodiment shown in FIG. 5, and to these bonding pads, a laser diode drive IC 30, a laser power monitor pro-amplifier IC 31, a light receiving pro-amplifier IC 32, and a power control IC 33 are flip-chip bonded.

The laser diode drive IC 30 can be controlled by supplying an output of the laser power monitor pre-amplifier IC 31 to the power control IC 33 via a wiring 38 formed on the $Si_3N_4$ film 15, and by supplying an output of the power control IC 33 to the laser diode drive IC 30 via another wiring 39 formed on the $Si_3N_4$ film 15.

Since the light receiving pre-amplifier 32 can be assembled on the same substrate, compact mounting can be realized. If an optical element of wavelength division multiplexing (WDM) filter which reflects light having a wavelength of 1.5 µm and transmits light having a wavelength of 3 µm is used as the cube type half mirror 18, a bidirectional optical terminal can be realized using two wavelengths of 1.3 µm and 1.5 µm.

Next, a method of manufacturing an integrated optical device of the first embodiment will be described with reference to FIGS. 7A to 7H.

The surface of a silicon substrate having the (1 0 0) plane is masked with an $SiO_2$ film, and openings are formed in the $SiO_2$ film by photolithography at the areas where lens guide V-shaped holes 17a to 17d and a cube type half mirror guide hole 19 are formed.

Figure 7A:
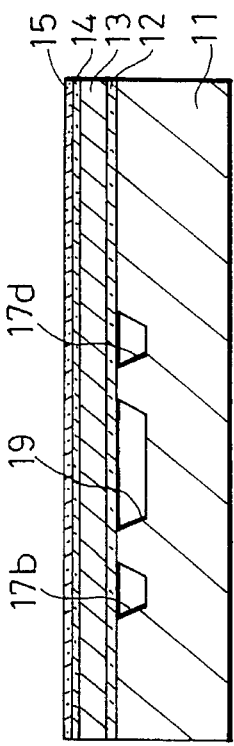
FIGS. 7A to 7H are cross sectional views and plan views explaining a method of manufacturing an integrated optical device of the first specific embodiment.

As shown in FIG. 7A, the (100) silicon substrate 11 is wet-etched by potassium hydroxide (KOH) aqueous solution so as to form the lens guide V-shaped holes 17a to 17d and cube type half mirror guide hole 19.

Since KOH aqueous solution hardly etches the (1 1 1) plane of silicon, the side walls of each hole have the (1 1 1) plane. In FIG. 7A, the lens guide V-shaped holes 17a and 17b are not shown because they are not present in this cross section.

The lens guide V-shaped holes 17a to 17d may be etched to form a V-shaped in section. In this case, however, the necessary depth is 333 µm so that the hole is etched to form an upside-down trapezoid in section. After the holes have been etched, the $SiO_2$ film used as the mask is removed.

Figure 7B:
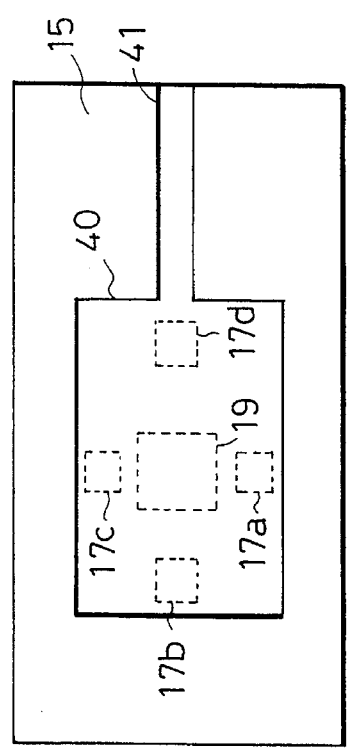

As shown in FIG. 7B, a silicon substrate 13 having the (1 0 0) plane with an $SiO_2$ film 12 having a thickness of 2 µm formed on the surface thereof is prepared. The silicon substrate 13 is bonded to the silicon substrate 11, with the $SiO_2$ film 12 adhered to the surface of the substrate 11 where the lens guide V-shaped holes are formed. In this case, two silicon substrates are heated to 800° C. or higher to bond them together at a molecule level.

Figure 7C:
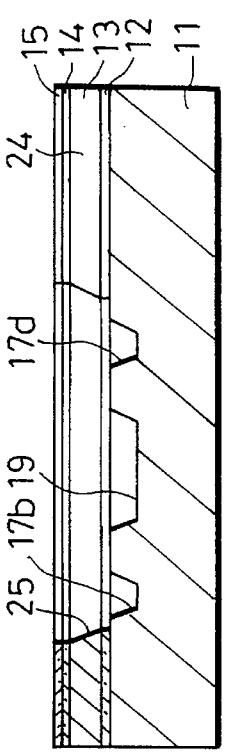
Figure 7D:
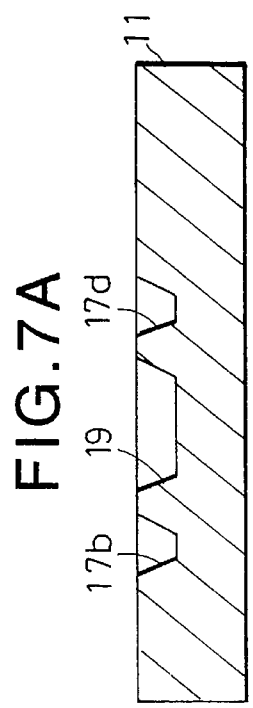

As shown in FIG. 7C, the silicon substrate 13 is polished to leave a silicon substrate 13 having a thickness of 55 µm. Next, as shown in FIG. 7D, an $SiO_2$ film 14 is formed on the surface of the silicon layer 13 to a thickness of 0.3 µm by thermal oxidation, and an $Si_3N_4$ film 15 is formed on the surface of the $SiO_2$ film 14 to a thickness of 0.3 µm by thermal CVD.

Figure 7E:
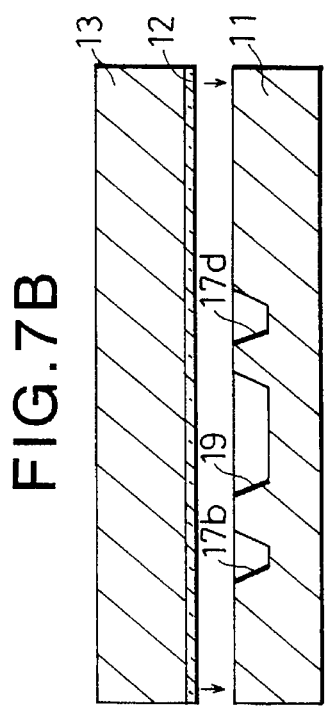

Next, as shown in the plan view of the substrate of FIG. 7E, openings 40 and 41 for forming an opening 25 and an optical fiber guide V-shaped groove 24 are formed in the $Si_3N_4$ film 15 and $SiO_2$ film 14.

Figure 7F:
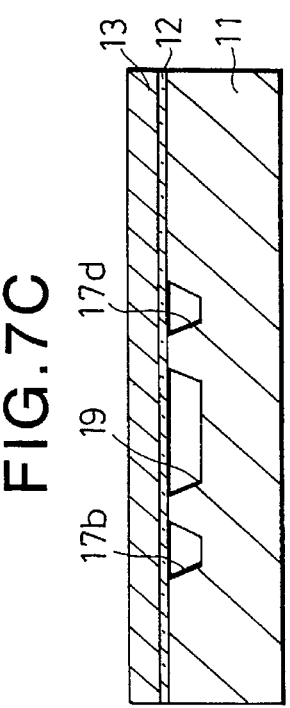

Next, as shown in FIG. 7F, by using the $Si_3N_4$ film 15 and $SiO_2$ film 14 as a mask, the opening 25 and optical fiber guide V-shaped groove 24 are formed by wet etching using KOH aqueous solution. The exposed $SiO_2$ film 12 is removed by using a mixed solution of hydrofluoric acid and ammonium fluoride. In the above manner, it is possible to prepare a substrate formed with the lens guide V-shaped (trapezoidal) holes 17a to 17d, cube type half mirror guide hole 19, and optical fiber guide V-shaped groove 24, for position alignment.

Next, bonding pads (not shown) for a laser diode chip 20 and edge incidence type photodiode chips 21 and 22 are formed on the surface of the $Si_3N_4$ film 15 by vacuum deposition and photolithography.

Figure 7G:
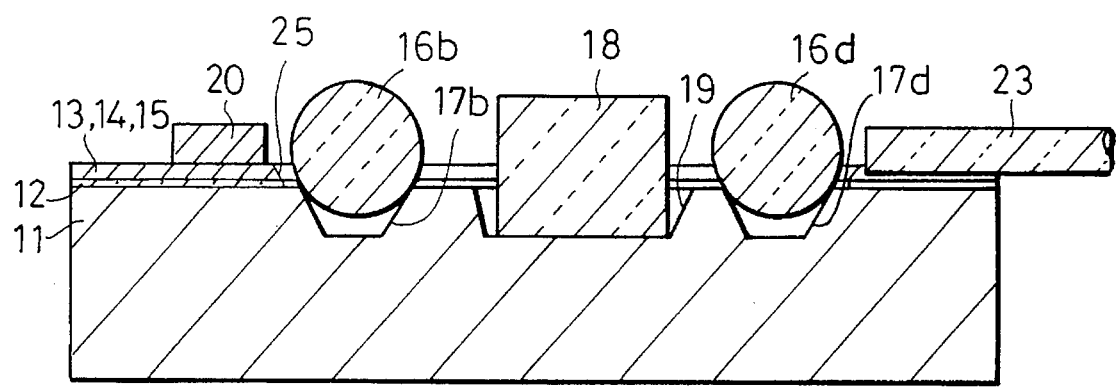

As shown in FIG. 7G, to the bonding pads, the laser diode chip 20 and photodiode chips 21 and 22 (not shown) are flip-chip bonded. Spherical lenses 16a to 16d, a cube type half mirror 18, and an optical fiber 23 are fitted in the lens guide V-shaped holes 17a to 17d, cube type half mirror guide hole 19, and optical fiber guide V-shaped groove 24.

Figure 7H:
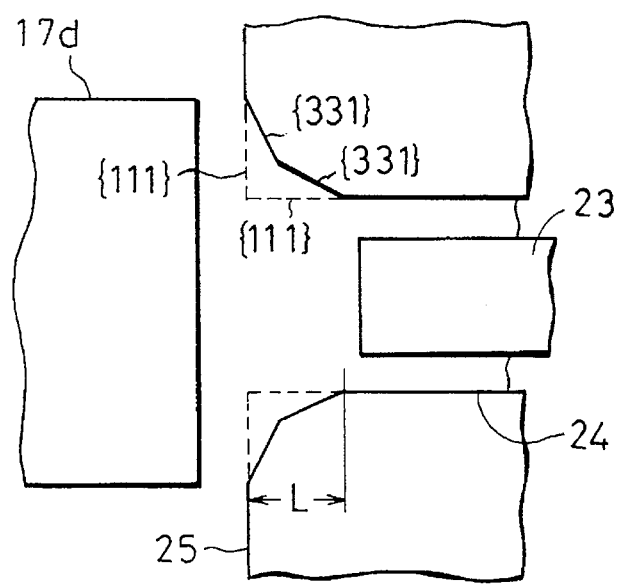

FIG. 7H shows the connection area between the opening 25 and the optical fiber guide V-shaped groove 24. The mask for the opening 25 and optical fiber guide V-shaped groove 24 has right angle corners indicated by broken lines in FIG. 7H. Silicon under the right angle corners is under-etched by KOH aqueous solution so that the (3 3 1) planes are exposed.

As a result, the port at the connection area between the opening 25 and optical fiber guide V-shaped groove 24 has no right angle corner, but rounded as indicated by solid lines in FIG. 7H.

The length of the under-etched region extending from the side of the opening 25 into the optical fiber guide V-shaped groove 24 is about 150 µm which poses no practical problem of optical fiber position alignment.

Techniques disclosed in opening applications by the present inventor (U.S. Ser. No. 08/186,027 filed on Jan. 25, 1994, German Patent Application P 4402422.3 filed on Jan. 27, 1994, and Japanese Patent Application 5-65559 filed on Mar. 24, 1993) may be used when necessary, which is herein incorporated by reference.

In the first embodiment, a light beam passes through the inside of the opening 25 so that no eclipse occurs at the surface of the silicon substrate even if the diameter of a light beam is set to 100 µm.

Furthermore, since the opening 25 is formed by photolithography and wet etching, substrates can be worked collectively and quickly in units of a wafer. As compared to light assisted etching having been used conventionally, a substrate work time can be shortened.

Still further, the guide holes 16a to 16d, and 19 for the position alignment of spherical lenses and a half mirror and the V-shaped groove 24 for the position alignment of an optical fiber can be formed by independent processes. Accordingly, the precision of the shapes of the guide holes and V-character groove can be improved. Particularly, the precision of the V-shaped groove 24 can be improved. The reason for this is given in the following.

Figure 17:
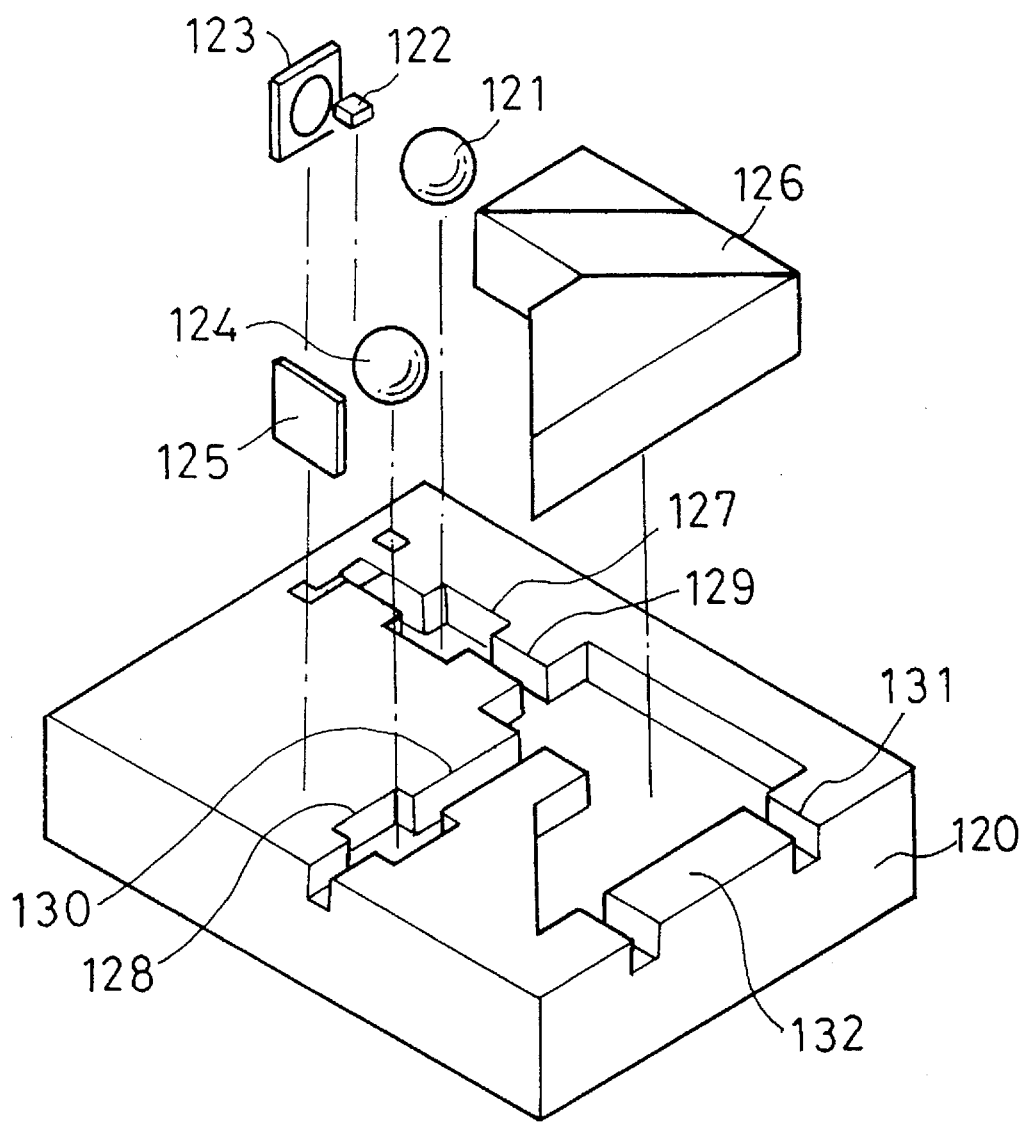
FIG. 17 is a perspective view of a conventional integrated optical device.

The guide holes 17a to 17d for the position alignment of lenses are deeper than the V-shaped groove 24 so that it takes a longer time to etch the guide holes. For example, if the conventional structure shown in FIG. 17 is used, it is necessary to etch the guide holes 17a to 17d and V-shaped groove 24 at the same time so that the V-shaped groove 24 is exposed to the etching solution until the guide holes have been etched to the necessary depth.

Silicon is therefore over-etched to widen the width of the V-shaped groove. In order to obtain a desired width of the V-shaped groove, it is necessary to set the width of the mask properly by taking into consideration the over-etch amount. However, the precision of the width of the V-shaped groove is lowered if the etching speed changes by the influence of a temperature and concentration of etchant.

In the first embodiment, the necessary depth of the V-shaped groove 24 is about 55 μm so that the side etch amount is small thereby improving the precision of the width of the V-shaped groove. The necessary depths of the guide holes 17a to 17d are less than the conventional structure shown in FIG. 17 so that the precision of the guide holes is also improved.

Next, a second embodiment of the present invention will be described with reference to FIGS. 8A to 8C.

Figure 8A:
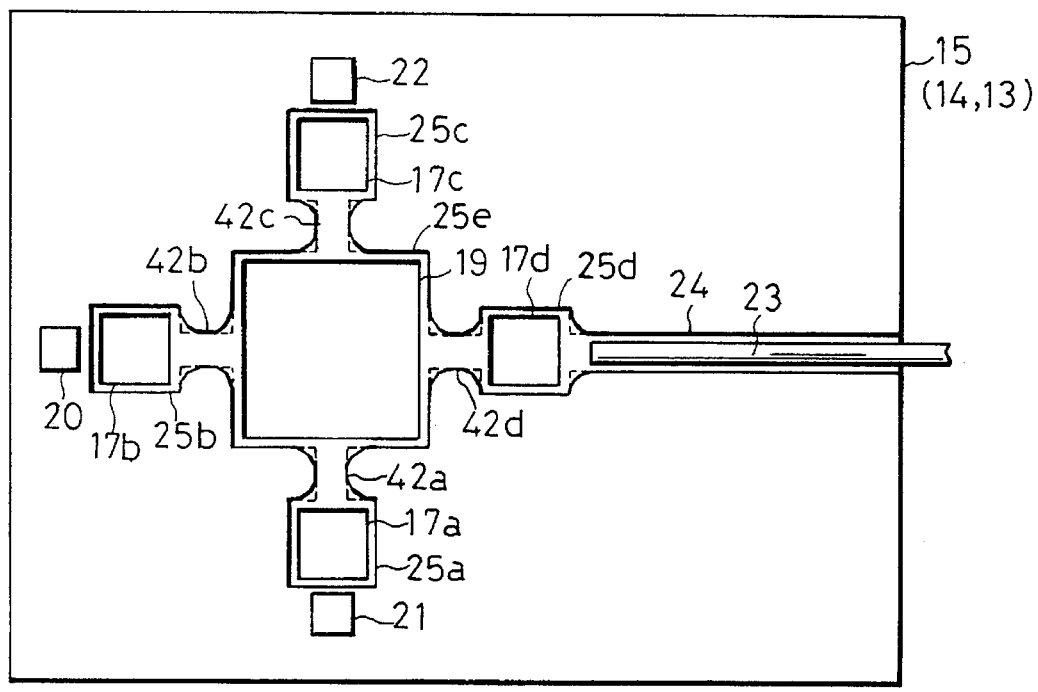
FIGS. 8A to 8C are plan views of an integrated optical device according to a second specific embodiment of the present invention.

FIG. 8A is a plan view of an integrated optical device of the second embodiment. Like elements to those of the integrated optical device of the first embodiment shown in FIG. 2 are represented by identical reference numerals. The different point of the second embodiment from the first embodiment is the shape of an opening 25 formed in a silicon layer 13.

Similar to the first embodiment, lens guide V-shaped holes 17a to 17d and cube type half mirror guide hole 19 are formed on the surface of a silicon substrate. Openings 25a to 25d, and 25e, and an optical fiber guide V-shaped groove 24 are formed in a silicon layer 13. The sizes of the bottoms of the openings 25a to 25d, and 25e are slightly larger than the sizes of the lens guide V-shaped holes 17a to 17d, and cube type half mirror guide hole 19.

Light beam transmitting grooves 42a to 42d are formed between the openings 25a to 25d for disposing spherical lenses and the opening 25e for disposing a cube type half mirror.

The openings 25a to 25e, light beam transmitting grooves 42a to 42d, and optical fiber guide V-shaped groove 24 are formed at the same time by etching the silicon layer 13.

Figure 8B:
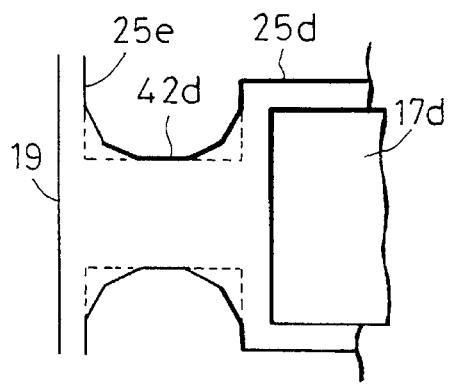

FIG. 8B is an enlarged view of the connection area of the opening 25d and light beam transmitting groove 42d. The silicon layer 13 is under-etched at the connection area, as stated earlier. However, this under-etched area is not relevant to the position alignment of optical components, and the function of the integrated optical device will not be affected.

Figure 8C:
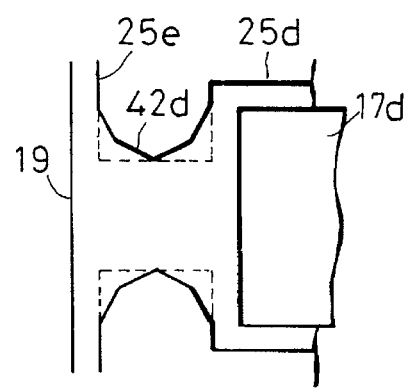

FIG. 8C illustrates the under-etched area formed when the length of the light beam transmitting groove 42d is set shorter. Because the light transmitting groove 42d is short, the under-etched area at the opening 25e and the under-etched area at the opening 25d connect together at the middle of the light beam transmitting groove, and the straight lines of the mask (indicated by broken lines) disappear.

In this case, there are no practical problems in position alignment of optical components similar to the case described in FIG. 8B.

In the second embodiment, the same effects as the first embodiment can be obtained.

Figure 9:
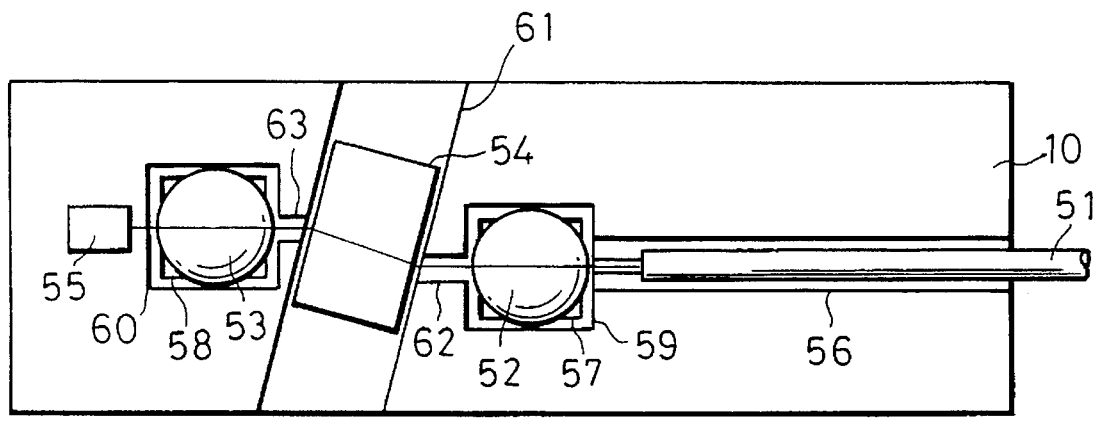
FIG. 9 is a plan view of the integrated optical device of a third specific embodiment of the present invention.

FIG. 9 is a schematic plan view of an integrated optical device according to a third embodiment of the present invention. A substrate 10 is formed in a similar manner to the first embodiment by attaching a silicon substrate 11 to a silicon layer 13.

A laser beam emitted from a laser diode chip 55 passes through a spherical lens 53, a photo-isolator 54, and a spherical lens 52, and becomes incident upon an optical fiber 51. The spherical lenses 52 and 53 are fitted in lens guide V-shaped holes 57 and 58 formed on the surface of the silicon substrate 11.

Similar to the second embodiment, openings 59 and 60 are formed in the silicon layer 13. The sizes of the bottoms of the openings 59 and 60 are slightly larger than the lens guide V-shaped holes 57 and 58.

The photo-isolator 54 is fitted in a photo-isolator guide groove 61 formed on the surface of the substrate by a dicing saw. The light incoming plane and outgoing plane of the photo-isolator 54 are disposed vertically on the surface of the substrate 10 and inclined by a predetermined angle from the optical axis.

Light beam transmitting grooves 62 and 63 via which a laser beam transmits are formed between the openings 59 and 60 and the photo-isolator guide groove 61. The light beam transmitting grooves 62 and 63, openings 59 and 60, and optical fiber guide V-shaped groove 56 are formed at the same time by etching the silicon layer 13.

Similar to the second embodiment shown in FIGS. 8A to 8C, when the silicon layer 13 is etched, although under-etched areas are formed at connection areas for the openings 59 and 60, optical fiber guide V-shaped groove 56, there is no practical problem in the position alignment of optical components.

With the arrangement described above, a compact photo-isolator can be inserted so that the operation of the laser diode can be prevented from becoming unstable by a returned laser beam.

Furthermore, since this embodiment uses the photo-isolator inserted obliquely relative to the optical axis, a laser beam reflected by the photo-isolator can be attenuated thereby further stabilizing the operation of the laser diode.

The effects of using the laminated silicon substrates are the same as the first embodiment.

Figure 10A:
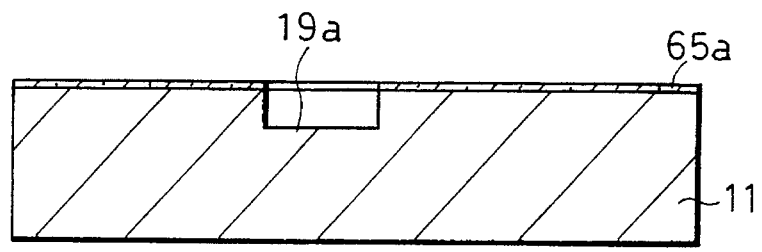
FIGS. 10A to 10C are cross sectional views explaining a method of manufacturing an integrated optical device according to a fourth specific embodiment of the present invention.
Figure 10B:
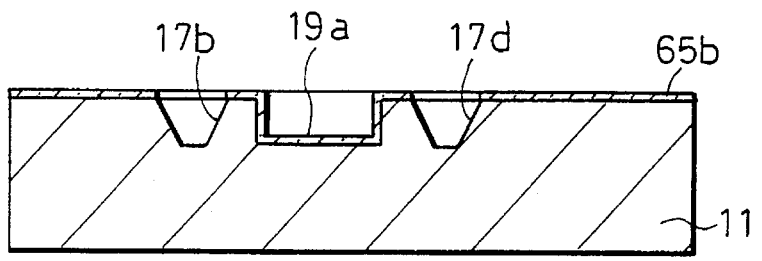
Figure 10C:
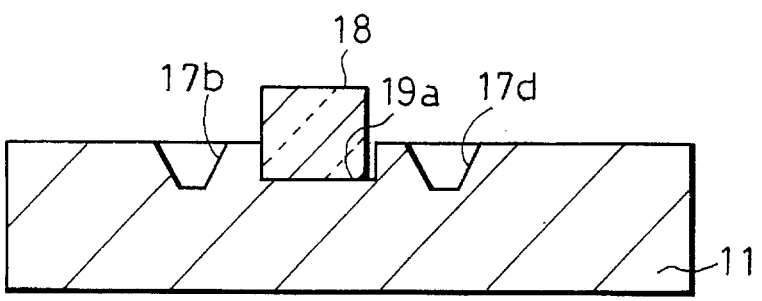

FIGS. 10A to 10C are cross sectional views explaining some of processes of manufacturing an integrated optical device according to a fourth embodiment of the present invention. Like elements to those of the integrated optical device of the first embodiment shown in FIG. 2 are represented by identical reference numerals.

The characteristic feature of this embodiment is that the cube type half mirror guide hole 19 of the integrated optical device of the first embodiment shown in FIG. 2 is formed not by anisotropic etching but by dry etching.

As shown in FIG. 10A, by using an SiO$_2$ film 65a formed on the surface of a silicon substrate 11 as a mask, a cube type half mirror guide hole 19a is formed by reactive ion beam etching (RIBE).

RIBE etches the substrate only in the vertical direction and scarcely side-etches the substrate. Therefore, the side walls of the cube type half mirror guide hole 19a are vertical relative to the substrate surface.

Next, as shown in FIG. 10B, the $SiO_2$ film 65a is removed, and thereafter the whole upper surface of the silicon substrate 11 is thermally oxidized to form thereon an $SiO_2$ film 65b. Openings for lens guide V-shape holes 17a to 17d are formed in the $SiO_2$ film 65b. Thereafter the silicon substrate 11 is selectively etched by KOH aqueous solution.

Next, the $SiO_2$ film 65b is removed, and thereafter the processes following the substrate adhesion process shown in FIG. 7B are executed like the first embodiment.

In this embodiment, the side walls of the cube type half mirror guide hole 19a are vertical so that the mount precision of a cube type half mirror 18 can be improved. The reason for this will be given in the following.

The cube type half mirror 18 does not require the up/down and right/left position precision. However, a high precision is required in the direction of rotation because if the cube type half mirror 18 rotates, the reflection angle of a laser beam changes.

Since the bottom of the cube type half mirror guide hole 19a has the (1 0 0) plane same as the substrate surface, the position alignment in the direction of rotation about the axis in parallel with the substrate surface can be made at a high precision.

There is a possibility of rotation about the axis perpendicular to the substrate surface if the size of the bottom of the cube type half mirror guide hole 19a is set slightly larger than that of the cube type half mirror 18.

In this embodiment, the side walls of the cube type half mirror guide hole 19a are vertical. As a result, the position alignment in the direction of rotation is ensured by pushing the side wall or walls intersecting at a right angle of the cube type half mirror 18 to the corresponding vertical side wall or walls of the cube type half mirror guide hole 19a as shown in FIG. 10C.

Figure 11A:
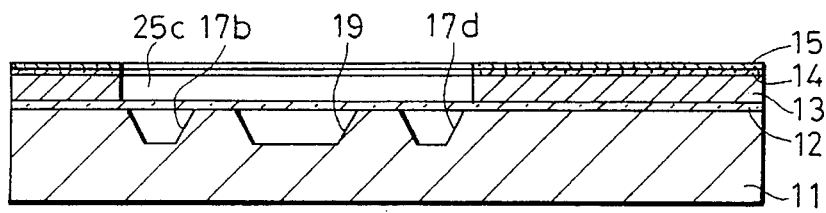
FIGS. 11A to 11C are cross sectional views explaining a method of manufacturing an integrated optical device according to a fifth specific embodiment of the present invention.
Figure 11B:
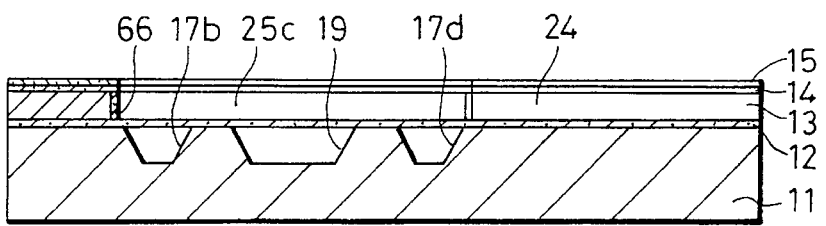
Figure 11C:
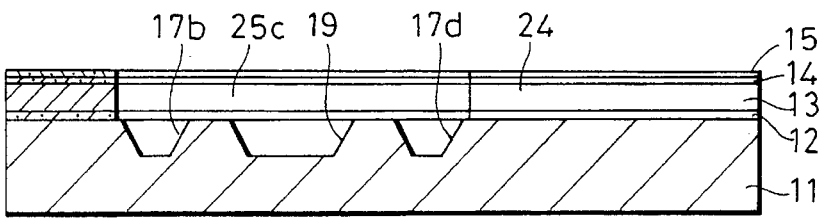

FIGS. 11A to 11C are cross sectional views explaining some of processes of manufacturing an integrated optical device according to a fifth embodiment of the present invention. The characteristic feature of this embodiment is that the opening 25 of the first embodiment shown in FIG. 2 is formed by dry etching having a high etching directivity, such as RIBE. This manufacturing method will be described with reference to FIGS. 11A to 11C.

By using the similar process as that of the first embodiment, an opening 40 is formed in an $SiO_2$ film 14 and an $Si_3N_4$ film 15 as shown in FIG. 7E. In this case, an opening 41 for an optical fiber guide V-shaped groove is not formed.

Next, as shown in FIG. 11A, a silicon layer 13 is etched by RIBE of silicon to form an opening 25c. In this case, an $SiO_2$ film 12 functions as an etch stop layer.

As shown in FIG. 11B, the whole upper surface of the substrate is thermally oxidized while leaving the $SiO_2$ film 14 and $Si_3N_4$ film 15. In this case, the region covered with the $Si_3N_4$ film 15 is not oxidized, but the silicon layer 13 at the side walls of the opening are oxidized to form an $SiO_2$ film 66.

An opening for an optical guide V-shaped groove is formed in the $SiO_2$ film 14 and $Si_3N_4$ film 15. After this opening is formed, the silicon layer 13 is wet-etched by KOH argueous solution to form the optical fiber guide V-shaped groove 24.

Next, as shown in FIG. 11C, the $SiO_2$ film 12 exposed at the bottoms of the opening 25c and optical fiber guide V-shaped groove 24 is removed to expose the lens guide V-shaped holes 17a to 17d and cube type half mirror guide hole 19. In this case, the $SiO_2$ film at the side walls of the opening 25c is also removed.

In this embodiment, since the side walls of the opening 25c is vertical, the distances between the optical fiber 23, laser diode chip 20, unrepresented photodiode chips 21 and 22 of the integrated optical device shown in FIG. 3 and the corresponding spherical lenses 16a to 16d can be made shorter. As a result, a lens having a large numerical aperture (NA) can be used, thereby improving an optical coupling efficiency.

Figure 12A:
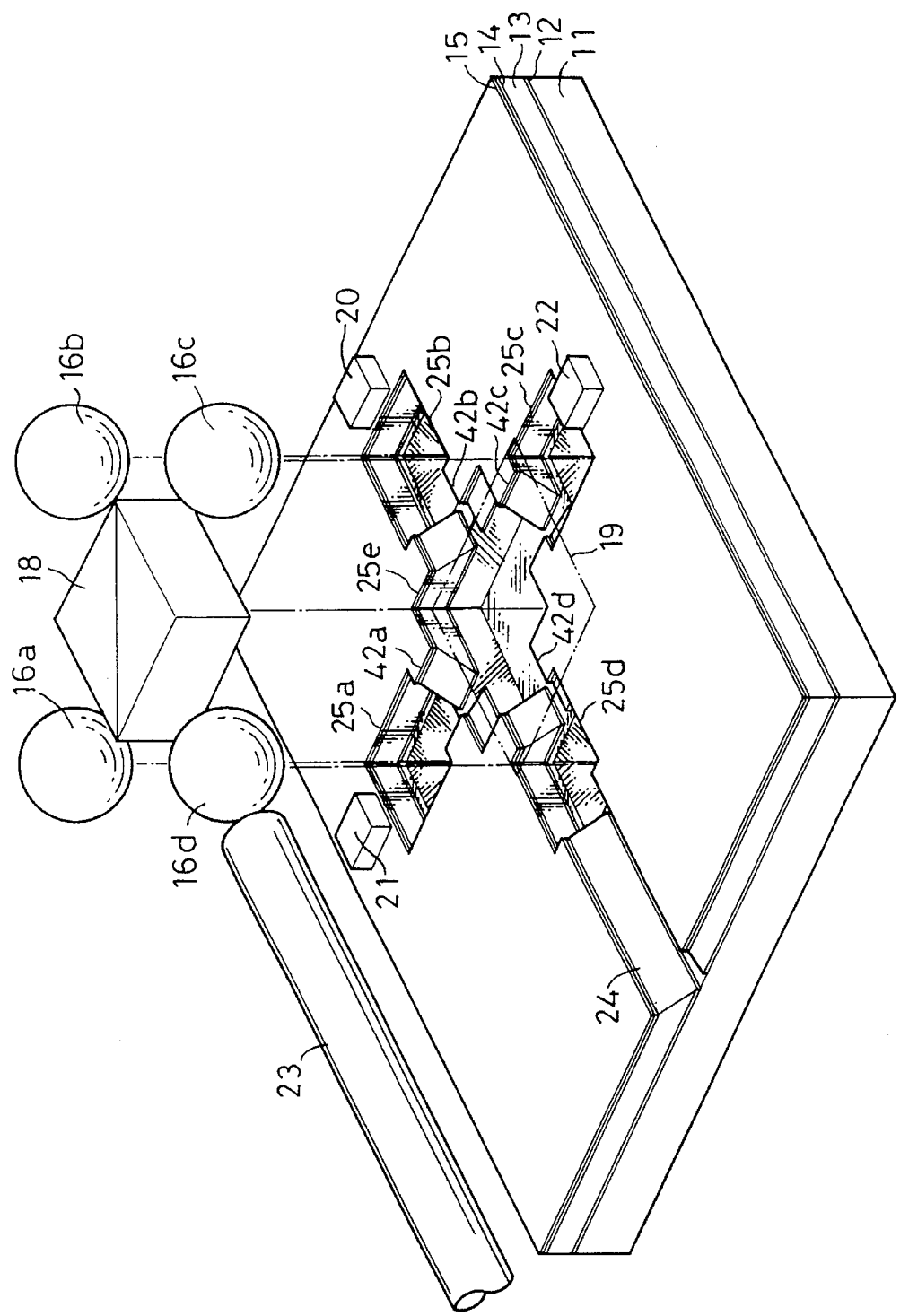
FIGS. 12A to 12C are a perspective view, plan view, and cross sectional view of an integrated optical device according a sixth specific embodiment of the present invention.
Figure 12B:
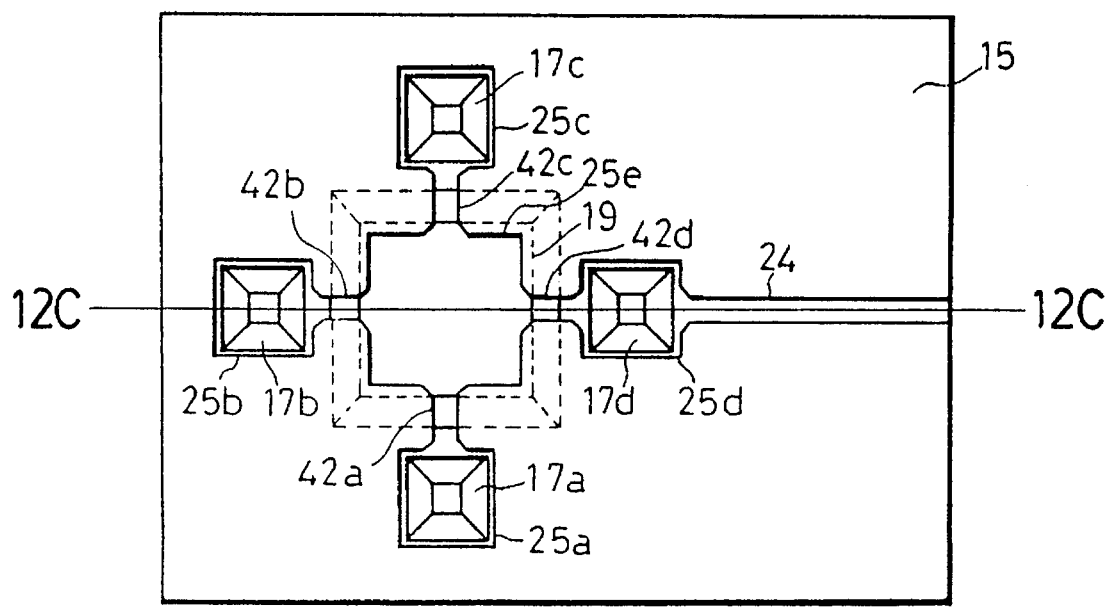
Figure 12C:
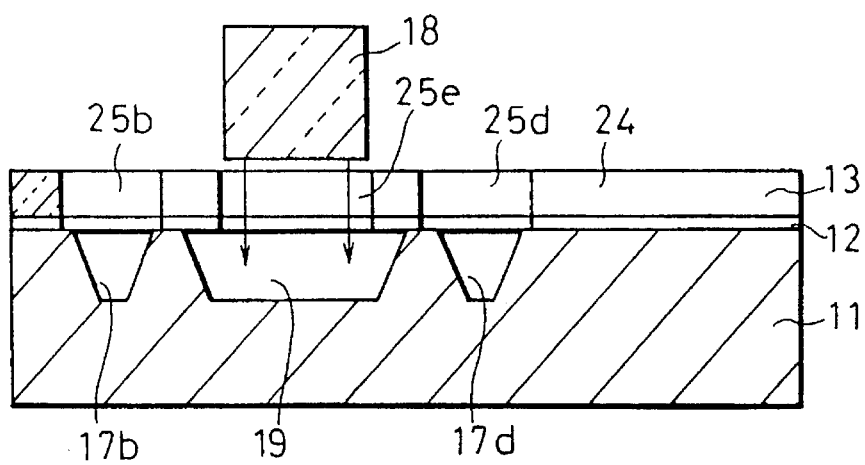

FIGS. 12A to 12C show an integrated optical device according to a sixth embodiment. Like elements to those of the integrated optical device shown in FIG. 8A are represented by identical reference numerals.

The characteristic feature of this embodiment is that the opening 25e of the integrated optical device of the second embodiment shown in FIGS. 8A to 8C is formed by dry etching having a high etching directivity such as RIBE, and that the size of the opening 25e is made smaller than that of the bottom of the cube type half mirror guide hole 19.

Figure 13A:
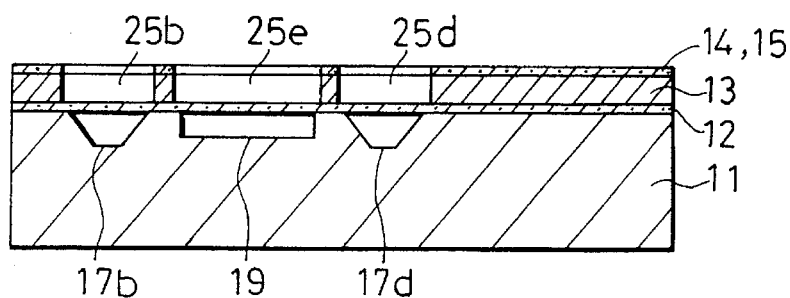
FIGS. 13A to 13D are cross sectional views explaining a method of manufacturing an integrated optical device of the sixth specific embodiment.

A method of manufacturing an integrated optical device of the sixth embodiment will first be described with reference to FIGS. 13A to 13D. A laminated or adhered substrates shown in FIG. 7C is prepared by the same method as the first embodiment. Next, as shown in FIG. 13A, an $SiO_2$ film 14 is formed to a thickness of 0.3 μm by thermally oxidating the surface of the silicon layer 13. Next, an $Si_3N_4$ film 15 is deposited to a thickness of 0.5 μm by thermal CVD.

Next, openings for etching the silicon layer 13 to form openings 25a to 25e are formed in the $SiO_2$ film 14 and $Si_3N_4$ film 15 by photolithography.

The openings 25a to 25e are formed by dry etching using a gas plasma of a mixed gas of $CF_4$ and oxygen as an etchant. In this case, the $SiO_2$ film functions as an etch stop layer. This etching has a directivity so that the side walls of the openings are generally vertical relative to the substrate surface.

Figure 13B:
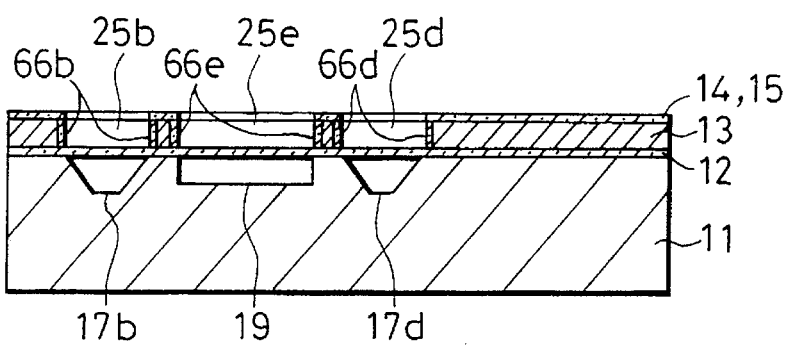

Next, as shown in FIG. 13B, $SiO_2$ films 66a to 66e are formed at the side walls of the openings 25a to 25e. Openings for light beam transmitting grooves 42a to 42d and optical fiber guide V-shaped groove 24 are formed in the $SiO_2$ film 14 and $Si_3N_4$ film 15.

Figure 13C:
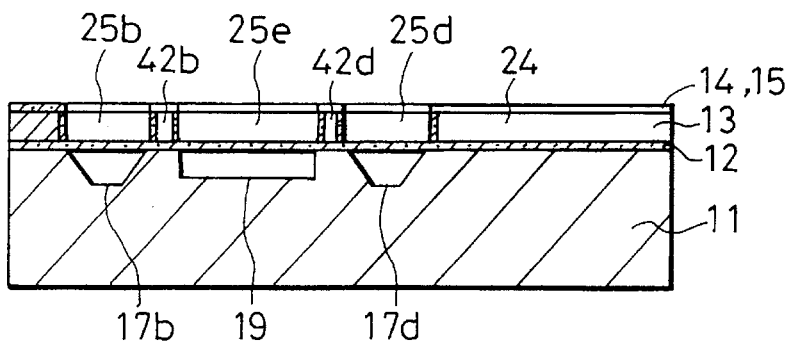

Next, as shown in FIG. 13C, the silicon layer 13 is wet-etched by KOH aqueous solution to form the light beam transmitting grooves 42a to 42d and optical fiber guide V-shaped groove 24.

Figure 13D:
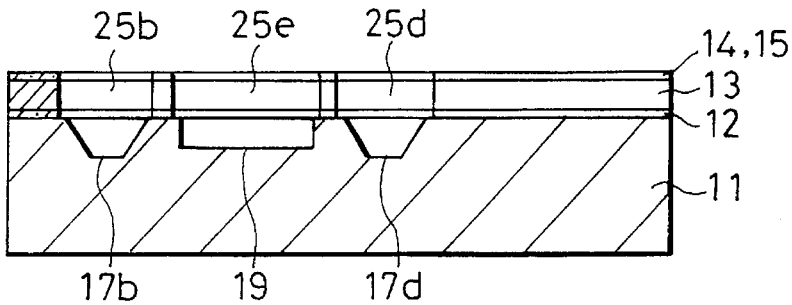

Next, as shown in FIG. 13D, by using a mixed solution of hydrofluoric acid and ammonium fluoride, the $SiO_2$ films 66a to 66e formed at the side walls of the openings 25a to 25e and the $SiO_2$ film 12 exposed at the bottom of the optical fiber guide V-shaped groove 24 are removed.

The effects of the integrated optical device of the sixth embodiment will be described with reference to FIGS. 12B and 12C. FIG. 12B is a plan view of the integrated optical device, and FIG. 12C is a cross sectional view cut along line D—D of FIG. 12B.

In this embodiment, the size of the bottom of the cube type half mirror guide hole 19 is larger than the opening 25e. As a result, the cube type half mirror guide hole 19 determines only the up/down position of, and the angular position of, in the direction of rotation about the axis in parallel with the substrate surface, the cube type half mirror 18.

Because the side walls of the opening 25e are vertical relative to the substrate surface, the position of, in the direction of rotation about the axis perpendicular to the substrate surface, and the position of, in the substrate surface, the cube type half mirror 18 can be aligned by pushing the side wall or walls of the cube type half mirror 18 against the vertical side walls of the opening 25e.

Since the positioning of the cube type half mirror 18 can be determined by using the side walls formed in the silicon layer 13 through part of which a laser beam transmits, the precision of position alignment can be improved.

FIG. 14 shows a first modification of the sixth embodiment according to the present invention. The different point of the first modification from the sixth embodiment is that the size of the opening 25e is larger than the bottom of the cube type half mirror guide hole 19.

In this first modification, if the portion of the cube type half mirror 18a inserted into the cube type half mirror guide hole 19 is made smaller and the portion of the mirror 18a fitted in the opening 25e is made larger, the effects same as the sixth embodiment are ensured.

The cube type half mirror guide hole 19 may be omitted. In this case, the cube type half mirror is aligned in position by the surface of the silicon substrate 11 exposed at the bottom of the opening 25c and by the side walls of the opening 25e.

Figure 15:
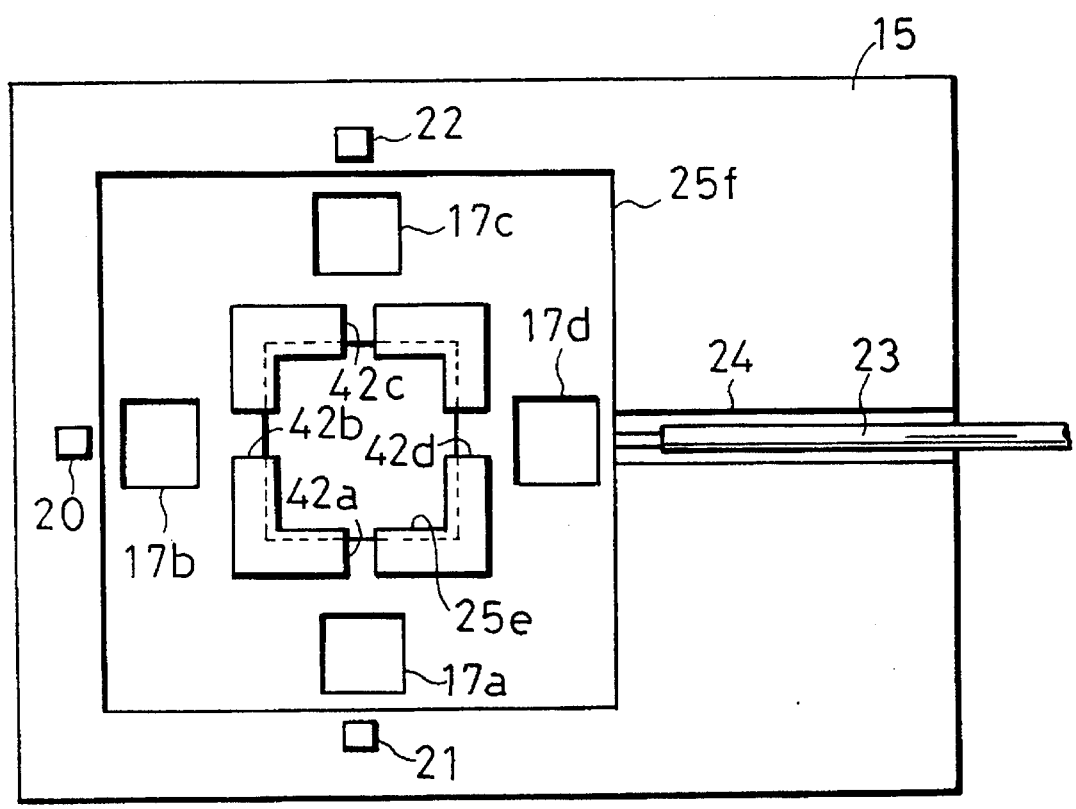
FIG. 15 is a plan view of an integrated optical device of a second modification of the sixth specific embodiment.
Figure 16:
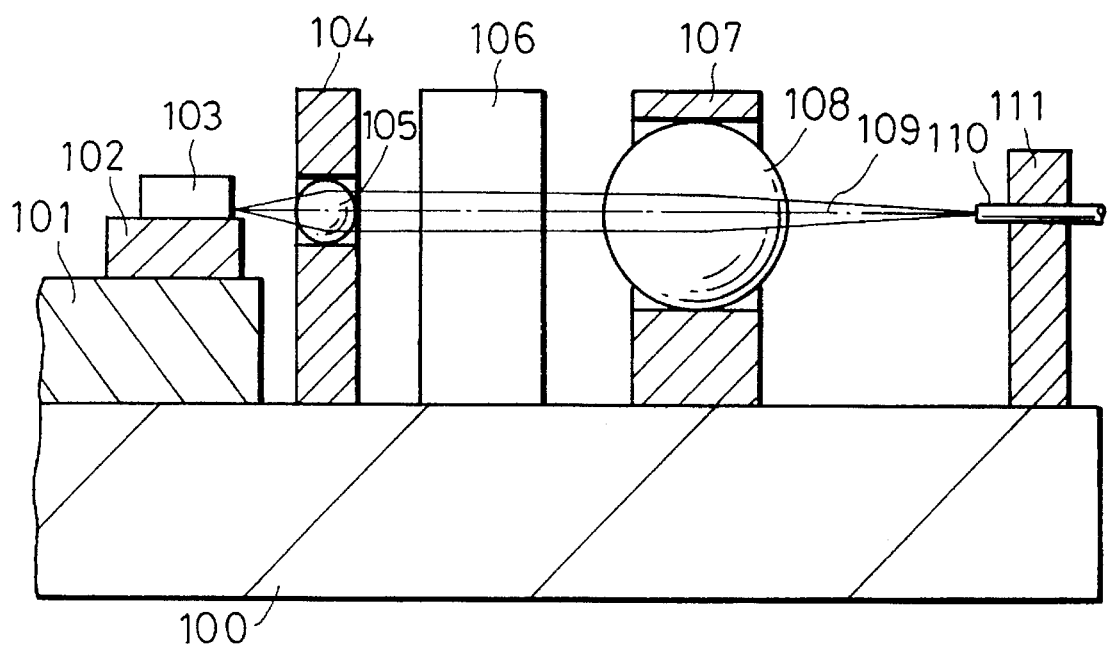
FIG. 16 is a cross sectional view of a conventional optical device.

FIG. 15 shows a second modification of the sixth embodiment. In this second modification, the openings 25a to 25d of the sixth embodiment shown in FIG. 12A are enlarged to form a single opening 25f surrounding the opening 25e.

In the manufacturing method of the sixth embodiment shown in FIGS. 13A to 13D, the openings 25a to 25d for inserting spherical lenses are formed by RIBE similar to the case of the opening 25e which aligns a cube type half mirror in position.

However, since the openings 25a to 25d are not required to be used for the position alignment of spherical lenses, these openings 25a to 25d may be formed by wet etching by KOH aqueous solution at the same time when the optical fiber V-shaped groove 24 is formed.

The present invention has been described in connection with the preferred embodiments. The invention is not limited only to the above embodiments. For example, wet etching may be performed by using ethylenediamine solution instead of KOH aqueous solution. It is apparent to those skilled in the art that various alterations, modifications, substitutions, combinations and the like can be made without departing from the scope of the appended claims.

I claim:

1. An integrated optical device comprising:

a support substrate having a first upper surface;

an optical system disposed on said support substrate including means for collimating an inputted light beam to produce a collimated light beam having a predetermined maximum beam radius and defining a plurality of optical axes along which said collimated light beam is transmitted, said optical axes being parallel to and at a first height above said first upper surface, and said first height being larger than said maximum beam radius of said collimated light beam;

an upper layer formed on said first upper surface and formed of a material which is selectively removable with respect to said substrate, and having a second upper surface at a second height larger than said beam radius and smaller than said first height and an opening formed in said upper layer accommodating said optical system therewithin;

a first optical component mounted on said second upper surface, and an optical axis aligned with an optical axis of said optical system so as to be optically connected with said optical system; and a second optical component mounted on said second upper layer with an optical axis aligned with an optical axis of said optical system so as to be optically connected with said optical system;

wherein the difference between said first height and said second height is smaller than said maximum beam radius, such that part of said collimated light beam passes under said second upper surface;

and wherein said upper layer is removed where said beam is transmitted, so as to prevent shielding of said beam.

2. An integrated optical device according to claim 1, wherein said first optical component includes a first optical semiconductor device, and said second optical component includes an optical fiber.

3. An integrated optical device according to claim 2, further comprising a fiber guide groove formed in said upper layer, said guide groove aligning said optical fiber in position, and communicating with said opening formed in said upper layer.

4. An integrated optical device according to claim 3, wherein said support substrate is a silicon substrate and said first upper surface thereof is a (100) crystal plane;

said upper layer includes a dielectric layer disposed on said first upper surface and a silicon layer laminated on said dielectric layer, said silicon layer providing said second upper surface as a (100) crystal plane;

wherein a lens guide groove is formed in a surface portion of said support substrate exposed in said opening formed in said upper layer, said lens guide groove being shaped in an upside-down quadrangular pyramid or an upside-down truncated quadrangular pyramid, said optical system including a spherical lens guided and positioned by said lens guide groove; and said first and second optical components and said spherical lens being positioned so that a light beam emitted from said first optical component is converged by said spherical lens at the end face of said optical fiber.

5. An integrated optical device according to claim 3, wherein said optical system further comprises:

a plurality of element guide grooves formed in a surface portion of said support substrate exposed in said opening formed in said upper layer; and said optical system includes a plurality of optical elements guided and positioned by said guide grooves.

6. An integrated optical device according to claim 5, wherein said support substrate is made of a silicon substrate having said first upper surface extending along a (100) crystal plane; and said upper layer includes a dielectric layer disposed on said first upper surface and a silicon layer laminated on said dielectric layer, said silicon layer having said second upper surface extending along a (100) crystal plane.

7. An integrated optical device according to claim 6, wherein said optical system comprises:

a first spherical lens aligned in position so that the optical axis of said first optical component passes through the center of said first spherical lens, and said first optical component is located at a focal point of said first spherical lens, and a second spherical lens aligned in position so that the optical axis of said second optical component passes through the center of said second spherical lens, and a light input/output portion of said second optical component is located at a focal point of said second spherical lens, the optical axes of said first and second optical components being optically connected by said optical system;

said element guide grooves include a first lens guide groove for guiding said first spherical lens therein, and being shaped in an upside-down quadrangular pyramid or an upside-down truncated quadrangular pyramid and a second lens guide groove for guiding said second spherical lens therein, and being shaped in an upside-down quadrangular pyramid or an upside-down truncated quadrangular pyramid.

8. An integrated optical device according to claim 7, wherein said first optical component is a laser diode and said optical system further comprises:

an optical isolator having light input/output planes through which a light beam enters or leaves, formed in parallel with each other, said optical isolator being disposed between said first spherical lens and said second spherical lens so that a light beam traveling through these lenses passes through said light input/output planes of said optical isolator, and an isolator guide groove having parallel side walls with a gap adapted to accommodate said optical isolator, said gap being formed in a surface portion of said support substrate exposed in said opening formed in said upper layer and between said first spherical lens and second spherical lens, said optical isolator fitting in said gap so as to be precisely held therein.

9. An integrated optical device according to claim 7, wherein said element guide grooves further comprise:

a center guide hole having a square opening including a first side facing said first lens guide groove, a second side disposed opposite to said first side and facing said second lens guide groove, a third side, and a fourth side disposed opposite to said third side;

a third lens guide groove facing said third side of said square opening of said center guide hole; and a fourth lens guide groove facing said fourth side of said square opening of said center guide hole; and said optical elements further comprise a beam splitter cube guided and positioned by said center guide hole, said beam splitter cube having a first vertical plane facing said first lens guide groove, a second vertical plane facing said second lens guide groove, a third vertical plane facing said third lens guide groove, and a fourth vertical plane facing said fourth lens guide groove;

a third spherical lens guided and positioned by said third lens guide groove so that the center of said third spherical lens lies on an optical axis through said third vertical plane;

a fourth spherical lens guided and positioned by said fourth lens guide groove so that the center of said fourth spherical lens lies on an optical axis through said fourth vertical plane; and said first optical component further comprises:

a second optical semiconductor device disposed at a position at the focal point of said third spherical lens and having an optical axis coincident with the optical axis through said third vertical plane; and a third optical semiconductor device disposed at a position at the focal point of said fourth spherical lens and having an optical axis coincident with the optical axis through said fourth vertical plane.

10. An integrated optical device according to claim 9, wherein said first optical semiconductor device is an edge output type laser diode mounted in position by bonding, and said second and third optical semiconductor devices are edge input type photodiodes mounted in position by bonding.

11. An integrated optical device according to claim 10, wherein said optical elements further comprise an optical isolator having light input/output planes, through which a light beam enters or leaves, which are formed in parallel with each other, said optical isolator being disposed between said first spherical lens and said beam splitter cube so that a light beam traveling along the optical axis through said first vertical plane of said beam splitter cube passes through said light input/output planes of said optical isolator; and said element guide grooves further include an isolator guide groove having a parallel slit gap in which said optical isolator is inserted, said slit gap being formed in a surface portion of said support substrate exposed in said opening and between said first spherical lens and said beam splitter cube, said optical isolator fitting in said slit gap so as to be precisely held therein.

12. An integrated optical device according to claim 9, wherein side walls of said center guide hole are vertical relative to said first upper surface, and comprise at least a pair of planes intersecting at a right angle.

13. An integrated optical device according to claim 6, wherein side walls of said opening [(25, 25a, 25b, 25c, 25d, 25e) of said upper layer are vertical to said second upper surface. of said upper layer are vertical to said second upper surface.

14. An integrated optical device according to claim 9, wherein said square opening comprises:

a plurality of lens holding portions each for accommodating a spherical lens;

a center opening for disposing said beam splitter cube therein; and a plurality of light beam transmitting grooves each formed along one of said optical axes and optically coupling a respective lens holding portion to said center opening portion, wherein side walls of said center opening portion are vertical relative to said second upper surface and comprise at least a pair of planes intersecting at a right angle.

15. An integrated optical device according to claim 14, wherein the area of said center opening is smaller in size than the area of the bottom of said center guide hole.

16. An integrated optical device according to claim 14, wherein the area of said center opening portion is larger in size than the area of the bottom of said center guide hole, and said beam splitter cube includes a lower part and an upper part including a half mirror, said lower part occupying an area of the substrate smaller than said bottom of said center hole and being inserted into said center hole, and said upper part having at least a pair of side walls intersecting at a right angle for aligning said upper part in position by fitting against corresponding side walls of said center opening portion.

17. An integrated optical device according to claim 14, wherein lens holding portions of said opening have side walls which are vertical relative to the surface of said silicon layer.

18. An integrated optical device according to claim 8, wherein said light input/output planes of said optical isolator are vertical relative to said first upper surface, and inclined by a predetermined angle relative to the optical axis of a light entering or leaving said optical isolator through said light input/output planes.

19. An integrated optical device according to claim 2, wherein said first optical semiconductor device is a laser diode or a photodiode.

* * * * *